(12) United States Patent
Nanba

(10) Patent No.: US 6,236,521 B1
(45) Date of Patent: May 22, 2001

(54) OBJECTIVE LENS AND IMAGE PICKUP DEVICE USING THE SAME

(75) Inventor: Norihiro Nanba, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/245,309

(22) Filed: Feb. 5, 1999

(30) Foreign Application Priority Data

Feb. 9, 1998 (JP) .................................................. 10-042874
Feb. 25, 1998 (JP) .................................................. 10-060640

(51) Int. Cl.$^7$ ...................................................... G02B 3/02
(52) U.S. Cl. ............................ 359/715; 359/660; 359/661; 359/781; 359/782
(58) Field of Search ................................... 359/660, 661, 359/781, 782, 715

(56) References Cited

U.S. PATENT DOCUMENTS

| | | | |
|---|---|---|---|
| 4,130,349 | 12/1978 | Hyakumura | 350/216 |
| 4,146,304 | 3/1979 | Tojyo | 350/175 |
| 4,674,844 | 6/1987 | Nishioka et al. | 350/469 |
| 4,984,878 | 1/1991 | Miyano | 350/469 |
| 5,050,974 * | 9/1991 | Takasugi et al. | 359/728 |
| 5,325,236 * | 6/1994 | Tanaka | 359/689 |
| 5,418,649 | 5/1995 | Igarashi | 359/716 |
| 5,706,141 | 1/1998 | Abe | 359/793 |
| 5,831,773 * | 11/1998 | Sato | 359/691 |
| 5,867,325 * | 2/1999 | Ohtake et al. | 359/684 |
| 6,104,547 * | 8/2000 | Nanba | 359/687 |

FOREIGN PATENT DOCUMENTS

| | | |
|---|---|---|
| 45-39875 | 12/1970 | (JP) . |
| 55-143517 | 11/1980 | (JP) . |
| 58-7 | 1/1983 | (JP) . |
| 60-32165 | 7/1985 | (JP) . |
| 61-46807 | 10/1986 | (JP) . |
| 5-20724 | 3/1993 | (JP) . |
| 5-37288 | 6/1993 | (JP) . |
| 7-122692 | 12/1995 | (JP) . |
| 9-189856 | 7/1997 | (JP) . |

* cited by examiner

Primary Examiner—Georgia Epps
Assistant Examiner—Tim Thompson
(74) Attorney, Agent, or Firm—Fitzpatrick, Cella, Harper & Scinto

(57) ABSTRACT

An objective lens including first, second, third, and fourth lens units in order from the object side. The first lens unit consists of a first lens of negative refractive power in the shape of a meniscus with a concave surface toward the image field side. The second lens unit consists of a second lens of positive refractive power. The third lens unit consists of a composite lens having joined together a third lens of negative refractive power with a concave surface toward the object side and a fourth lens of positive refractive power with a convex surface toward the image field side, the third lens unit having as a whole negative refractive power. The fourth lens unit consists of a fifth lens of positive refractive power. The objective lens has a predetermined condition for focal length.

22 Claims, 20 Drawing Sheets

INDEFINITE FOCUS STATE

COLLAPSE STATE

OBJECTIVE LENS AND IMAGE PICKUP DEVICE USING THE SAME

BACKGROUND OF THE INVENTION

1. Field of the Invention

The present invention relates to an objective lens and an image pickup device using the same and is appropriate in particular to a camera system in a device using an image pickup element such as digital still camera, a video camera, a broadcasting camera or a photograph camera with an exit pupil kept far apart from the image field while widening an angle of field devised by employing the retro-focus type.

2. Related Background Art

Recent years, a digital still camera has been spreading out as the image input device. In this digital still camera there is generally carried out a process comprising AD-converting an output signal from a solid image pickup element such as CCD into image data, subjecting them to an image compression such as JPEG and storing the compressed data in a storage medium such as flash memory. After being developed on a computer, the compressed data thus stored are displayed on a monitor or the like.

In such a digital still camera, a higher precision of photographed images and a smaller size of image pickup devices has recently become a task and the compatibility of a high resolution and a smaller size is required therewith. Especially, to attain a thin model camera with stress laid on the portability, shortening the total lens length is required in a photographing lens (objective lens). For shortening the total lens length, it is advantageous to use an objective lens having as small a number of constituent lenses as possible.

Besides, as objective lenses for implementing a wide angle of field, many retro-focus type ones composed of a front lens unit having a negative refractive power and a rear lens unit having a positive refractive power are known. Especially as retro-focus type objective lenses having a small number of constituent lenses, those of the above front lens unit comprising one negative lens are proposed.

As such retro-focus type objective lenses with a front lens unit comprising one negative lens, for example, a 3 group 3 piece configuration comprising a negative lens, a positive lens and a positive lens in sequence from the object side is disclosed in U.S. Pat. No. 5,418,649 and a 3 group 4 piece configuration comprising a negative lens, a positive lens and a positive composite lens in sequence from the object side is disclosed in another embodiment of the same U.S. Pat. No. 5,418,649. As other examples, Japanese Patent Publication No. 7-122692 (corresponding to U.S. Pat. No. 4,984,878), Japanese Patent Publication No. 5-37288, Japanese Patent Publication No. 5-20724, Japanese Patent Publication No. 61-46807, Japanese Patent Publication No. 58-7 and Japanese Patent Application Laid-Open No. 9-189856 (corresponding to U.S. Pat. No. 5,706,141), U.S. Pat. No. 4,146,304, U.S. Pat. No. 4,674,844 and Japanese Patent Publication No. 60-32165 (corresponding to U.S. Pat. No. 4,130,349) disclose a 4 group 4 piece configuration comprising: a negative lens, a positive lens, a positive lens and a positive lens in sequence from the object side; a 4 group 4 piece configuration comprising:

a negative lens, a positive lens, a negative lens and a positive lens in sequence from the object side;

a 4 group 4 piece configuration comprising:

a negative lens, a positive lens, a positive lens and a negative lens in sequence from the object side;

a 4 group 5 piece configuration comprising: a negative lens, a positive lens, a positive lens and a positive composite lens in sequence from the object side;

a 4 group 5 piece configuration comprising:

a negative lens, a positive lens, a negative composite lens and a positive lens in sequence from the object side;

a 4 group 5 piece configuration comprising:

a negative lens, a positive lens, a positive composite lens and a negative lens in sequence from the object side; and a 5 group 5 piece configuration comprising:

a negative lens, a positive lens, a negative lens, a positive lens, and a positive lens in sequence from the object side, respectively. All of them are of retro-focus model and consist of a negative front lens unit and a positive rear lens unit.

Besides, the focusing approach is divided into the pan focus approach with the pint fixed at an ultrafocal length and a method for focusing by driving the focusing lens for each release. Generally, in a digital still camera of much consumed power, it is desired to lengthen the service life of a battery and the pan focus is effective for saving the power consumption. To obtain an image of high resolution, however, focusing is preferably made so as to make the pint best according to the object distance. Especially, in the case of a macro photographing with an objective lens small in shortest object distance, those of focusing mechanism is better than those of pan focus.

As regards a retro-focus type objective lens, the total thrust method by moving the whole lens system is well known. Besides, as a method of making a partial thrust while making a total thrust and a rear focus method by thrusting a lens on the image side, Japanese Patent Publication No. 45-39875 and Japanese Patent Application Laid-Open No. 55-143517 are referred to.

Besides, as a method for the thinnest possible image pickup device in optical axis, a collapsible mount method comprising moving the objective lens toward the imaging surface side and collapsing it into the front cover of a camera when not using is well known. To minimize the drive mechanism including the actuator of lenses in the collapsible mount method, it is effective to make the focus mechanism and the collapsible mount mechanism into common use by collapsing the focusing lens in a single focus lens.

In the photographing system using a solid image pickup element, the incident angle to the receiving surface of an off-axis ray increases with a smaller distance from the image field to the exit pupil, so that a problem of shading or the like takes place. Thus, the objective lens of a image pickup system using such an image pickup element must be chosen to a telecentric optical system with an exit pupil kept sufficiently apart from the image field. To be specific, the objective lens is so arranged preferably that the off-axis chief ray incident to the optical axis at an angle corresponding to the photographing face angle reaches the image pickup element forming an imaging surface nearly in parallel with the optical axis. The wider the photographing face angle is, the stronger the refractive power required for such a refraction of an off-axis chief ray as to become in parallel with the optical axis is.

Generally, affording a negative refractive power to a group of lenses on the object side from the stop and a positive refractive power to a group of lenses on the image field side from the stop is advantageous to the reduction of an angle of an off-axis chief ray with the optical axis, i.e., to make it nearly parallel to the optical axis. Namely, in a retro-focus type objective lens, the front group of a negative refractive power is generally disposed on the object side with respect to the stop and accordingly the angle of an off-axis chief ray with the optical axis can be reduced in presence of this front group. In the positive rear group, the angle of an off-axis chief ray with the optical axis can be reduced under action of positive lenses on the image field side with respect to the stop. Since both the front lens unit and the rear lens unit have an effect of making the exit pupil apart from the image field side, the retro-focus type optical system is very effective in the case of a wide photographing face angle.

Furthermore, for making the exit pupil sufficiently apart from the image field by shortening the total lens length, it is preferable to set at least the final lens of the rear group to a positive lens. More preferably, the surface on the image field side of the lens directly in front of the final lens is set to a convex surface. In such a manner, since the action of refracting an off-axis chief ray can be shared between the surfaces of three lenses including the final lens, the refractive power of the final lens cannot be made extremely strong. Too strong a refractive power of the final lens is inadequate because of causing the barrel-shaped aberration and the astigmatism.

From these, it is concluded that to employ the retro-focus type as the whole system and to set only the first lens of the negative front group and the final lens of the positive rear group to positive lenses is effective for making the objective lens telecentric at a wider photographing face angle and in a shortened total lens length and that the surface on the image field side of the lens directly in front of the final lens is preferably convex.

Furthermore, it is necessary for a better planarity of an image field to reduce the Petzval sum to some extent. If there is no negative refractive power in the above rear group, it is necessary for the reduction of the Petzval sum to intensify the refractive power of the first lens in the front group to considerable extent. On intensifying the refractive power of the first lens like this, a very large barrel-shaped aberration occurs as a result. In general cameras including a digital still camera, a large aberration is problematic. If there is a negative refractive power in the rear lens unit, the Petzval term in the rear lens unit can be control to some extent. Since the Petzval term in the front lens unit comprising a single lens is not corrected within the lens unit, it is only necessary to set the Petzval term in the rear lens unit in such a manner as to correct the front lens unit. Thus, for better image field characteristics, it is required that the rear lens unit has at least one concave lens or a group of composite lenses having a negative refractive power.

The configurations of Japanese Patent Publication No. 5-20724 and U.S. Pat. No. 4,674,844 have a problem that the exit pupil cannot be made sufficiently apart from the image field in the case of a shortened back focus because the final lens is not a positive lens.

The 3 group 3 piece configuration of U.S. Pat. No. 5,418,649 and the configuration of Japanese Patent Publication No. 7-122692 have a problem that the exit pupil cannot be made sufficiently apart from the image field while reducing the Petzval sum because there is no concave lens in the rear group.

In the 3 group 4 piece configuration of U.S. Pat. No. 5,418,649 and the configurations of Japanese Patent Publication No. 61-46807 and U.S. Pat. No. 4,146,304, the rear lens unit has a negative lens, which constitutes a positive composite lens. This negative lens is effective in the chromatic aberration, but these configurations have a problem that the exit pupil cannot be made sufficiently apart from the image field while reducing the Petzval sum.

In Japanese Patent Publication No. 5-37288, the rear lens unit has an independent negative lens. However, this negative lens is the lens directly in front of the final lens. Since the surface on the image field is concave, the exit pupil cannot be made sufficiently apart from the image field unless the refractive power of the final lens is made considerably greater. In the configuration of Japanese Patent Publication No. 5-37288, the refractive power of the final lens is not so strong as to make the pupil sufficiently apart from the image field. Besides, on excessively intensifying the refractive power of the final lens for making the pupil sufficiently apart from the image field, a barrel-shaped aberration and a astigmatism occur and therefore this intensification is inappropriate. Also in the configuration of Japanese Patent Publication No. 58-7, the negative composite lens directly in front of the final lens is of meniscus shape having a strongly concave surface on the image field side.

Besides, in Japanese Patent Application Laid-Open No. 9-189856, the composite lens is so constructed as to have a convex surface toward the image field side but to be 48° in the angle of field and does not correspond to an objective lens of a wide angle of field. Furthermore, since the refractive power of the composite system comprising the first lens unit and the second lens unit is weak, the lens back is so long that a compact camera cannot be constructed in the direction of the optical axis.

Besides, on employing the total thrust as a focusing method, the weight of the moving lens unit becomes heavy. In a camera having an autofocus mechanism, a good response of the focusing lens is desired. And, in a camera of much consumed power, a small power needed for the focusing is desired. For this purpose, the focusing lens is preferably as small in size and light in weight as possible and the total thrust is disadvantageous in this respect. Japanese Patent Publication No. 45-39875 has also a similar problem.

The rear focus scheme of Japanese Patent Application Laid-Open No. 55-143517 requires a space for thrust on the side of the focusing lens. Besides, a space for adjusting the shift of a pint due to manufacturing errors or assembling errors is further required in front of or behind the focusing lens, which is disadvantageous to constructing a compact camera in the optical axis direction. And, in an attempt to the compaction at the time of not photographing, it is required to move lenses on the object side rather than the focusing lens and a plurality of drive systems are required.

Besides, on employing the first lens unit as a focusing lens in the configuration of Japanese Patent Publication No. 60-32165, variations in short-distance spherical aberration and curvature of field are marked. Since in a short distance, the spherical aberration varies greatly on the under side and the curvature of field varies greatly on the over side, no focusible construction is formed in the first lens unit.

SUMMARY OF THE INVENTION

It is a first object of the present invention to provide a telecentric objective lens good in optical performance over all the object distance from an infinite object to a near object with an exit pupil kept far apart from the image field while a wider photographing face angle and a shorter total lens length intended by appropriately setting the lens configuration.

Besides, it is a second object to provide an image pickup device excellent in focusing response and small in power consumption.

Furthermore, it is a third object to provide an image pickup device further compact in the direction of optical axis at the time of not photographing.

To attain these objects, an objective lens according to the present invention is featured by the provision of:

a first lens unit consisting of a first lens of negative refractive power in the shape of a meniscus with a concave surface toward the image field side;

a second lens unit consisting of a second lens of positive refractive power;

a third lens unit consisting of a composite lens joined of a third lens of negative refractive power with a concave surface toward the object side and a fourth lens of positive refractive power with a convex surface toward the image field side and totally having negative refractive power; and a fourth lens unit consisting of a fifth lens of positive refractive power;

in sequence from the object side, wherein on letting fi, f12 and f be the focal length of an i-th lens unit, the composite focal length of the first lens unit and a second lens unit and the focal length of the whole objective lens system, respectively, the conditions of $0.7 < |f1|/f < 3.0$, $0.7 < f4/f < 3.0$, and $0.8 < f12/f < 2.5$ are satisfied.

Besides, another objective lens according to the present invention is featured by the provision of:

a front lens unit of negative refractive power consisting of a first lens of negative refractive power in the shape of a meniscus with a convex surface toward the image field side;

and a rear lens unit comprising a second lens of positive refractive power nearest to the object with a convex surface directed toward the object side; in sequence from the object side, wherein focusing is carried out by moving the above front lens unit in the direction of the optical axis.

Besides, an image pickup device according to the present invention is featured by the provision of an objective lens comprising the following units in sequence from the object side:

a front lens unit of negative refractive power consisting of a first lens of negative refractive power in the shape of a meniscus with a concave surface directed toward the image field side;

and a rear lens unit comprising a second lens of positive refractive power nearest to the object with a convex surface directed toward the object side; wherein focusing is carried out by moving the above front lens unit in the direction of the optical axis;

driving means for moving the above front lens unit in focusing;

and selecting means for selecting a specific mode from a plurality of modes in possession of the above image pickup device, wherein when a predetermined mode is selected, the above front lens unit is moved by the driving means to a still nearer position of than the focused position for an infinite object.

DETAILED DESCRIPTION OF THE PREFERRED EMBODIMENTS

Figure 1:
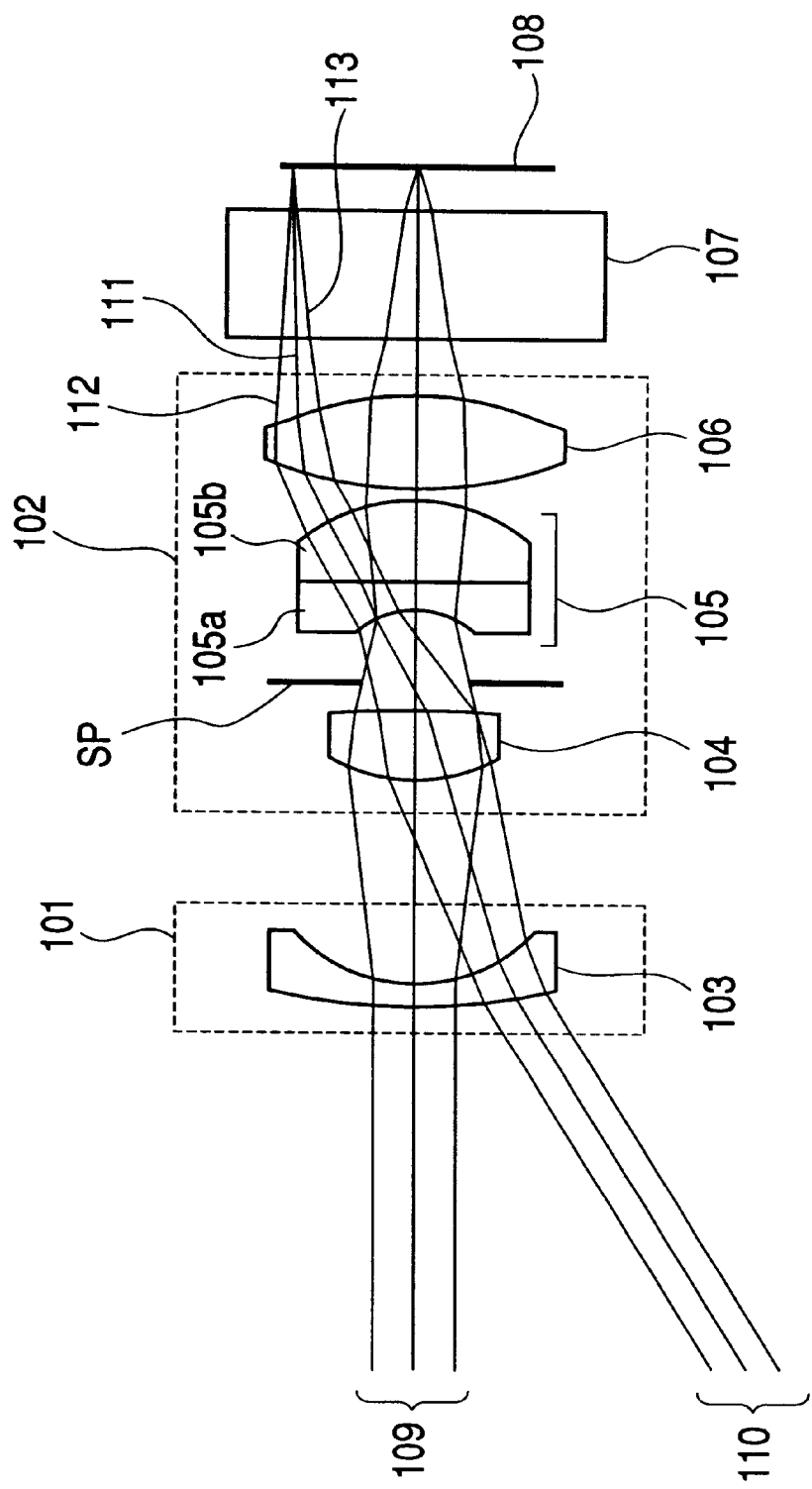
FIG. 1 is an illustration of the basic configuration of an objective lens according to the Embodiment.
Figure 2:
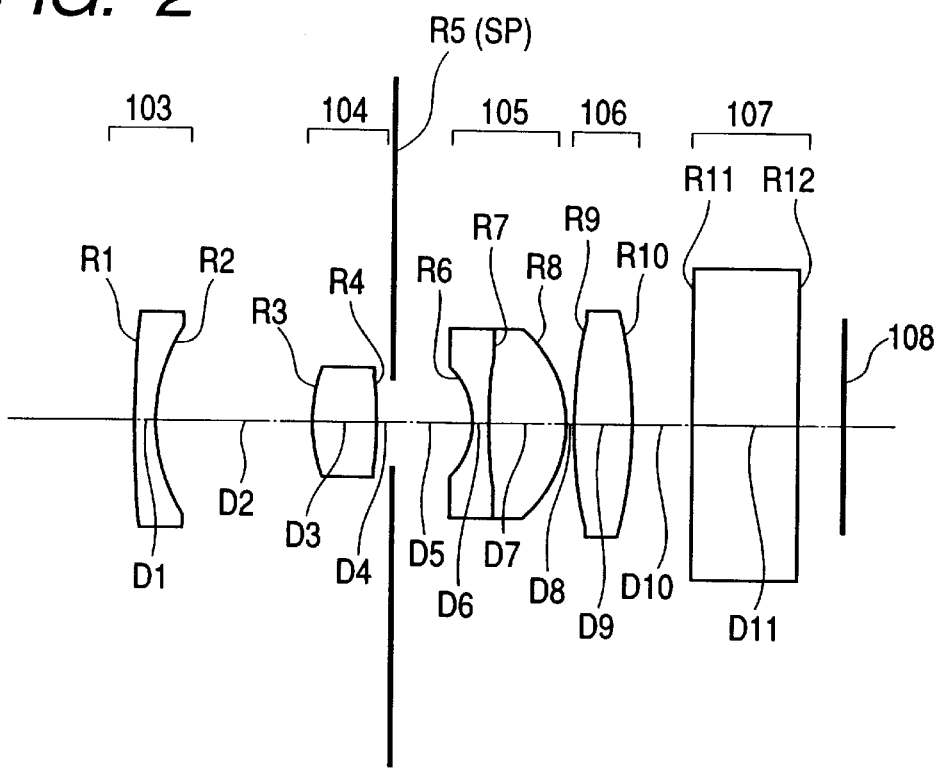
FIG. 2 is a sectional lens view of an objective lens according to Numerical Example 1.
Figure 3:
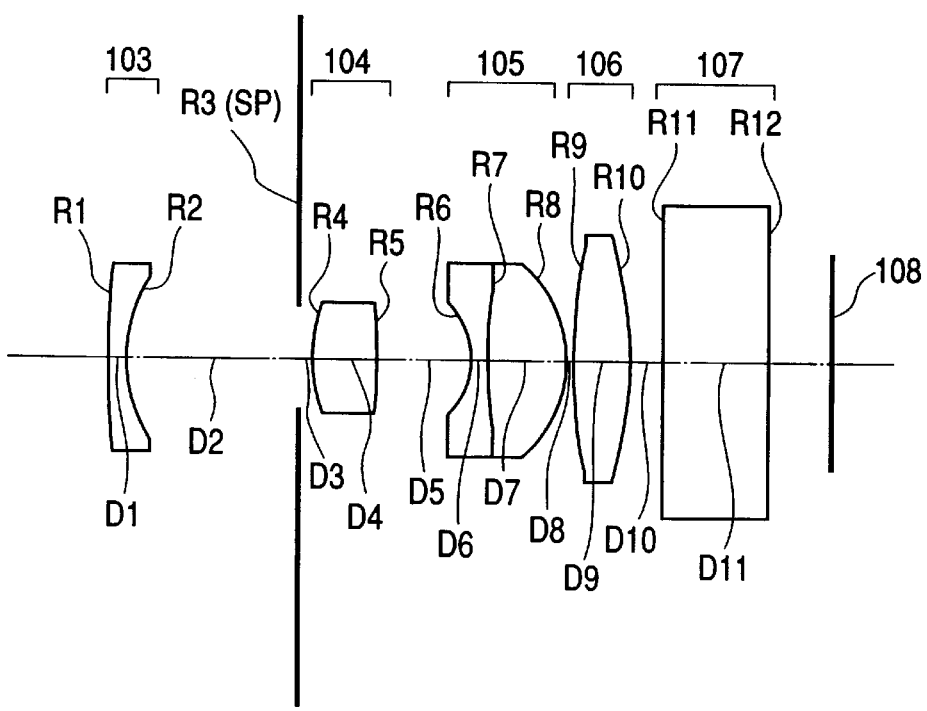
FIG. 3 is a sectional lens view of an objective lens according to Numerical Example 2.
Figure 4:
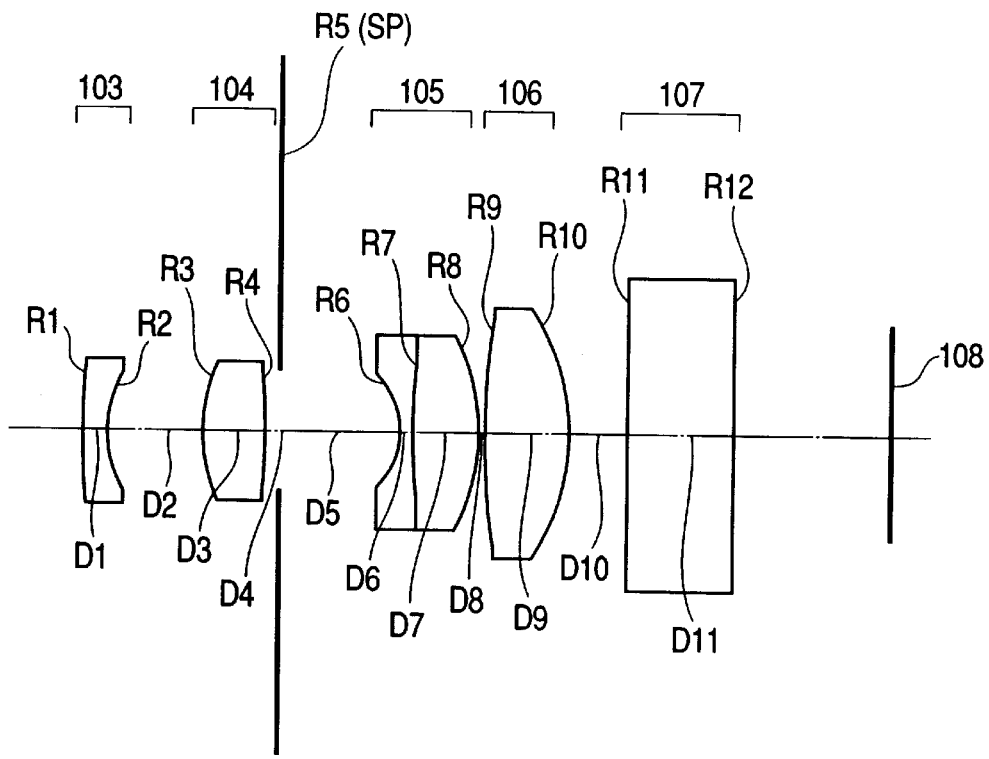
FIG. 4 is a sectional lens view of an objective lens according to Numerical Example 3.
Figure 5:
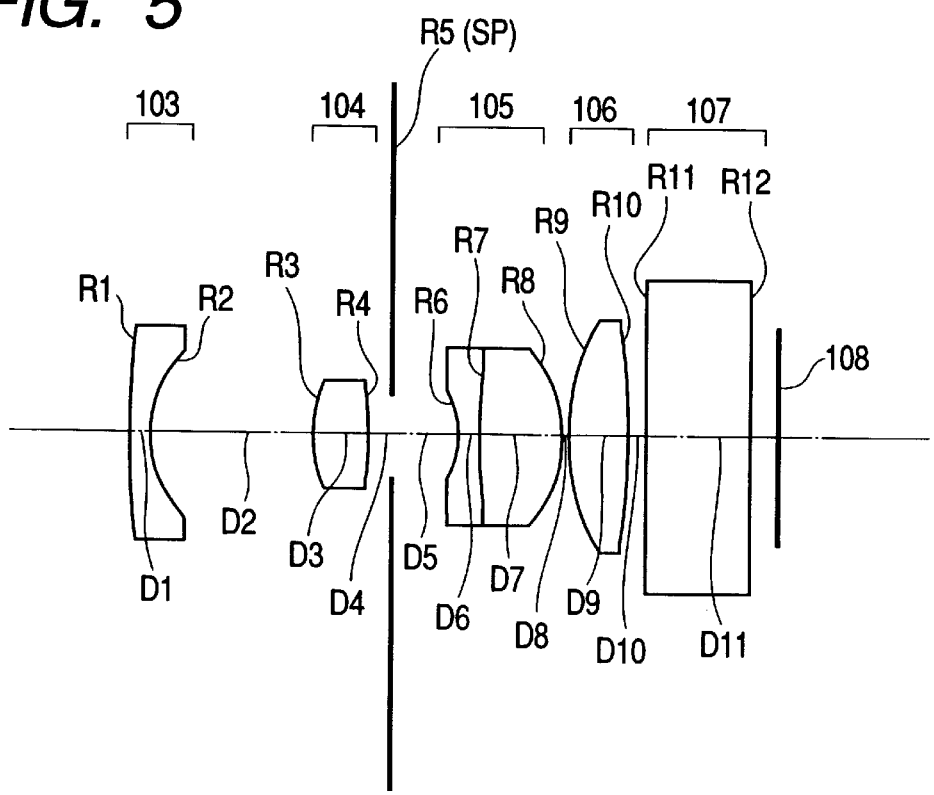
FIG. 5 is a sectional lens view of an objective lens according to Numerical Example 4.
Figure 6:
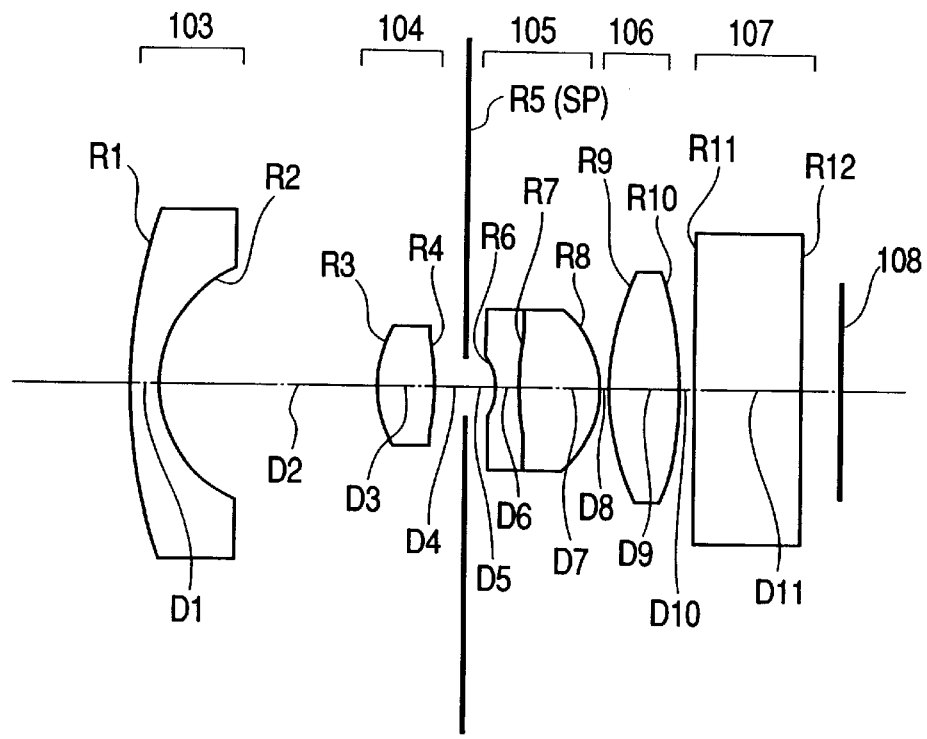
FIG. 6 is a sectional lens view of an objective lens according to Numerical Example 5.
Figure 7:
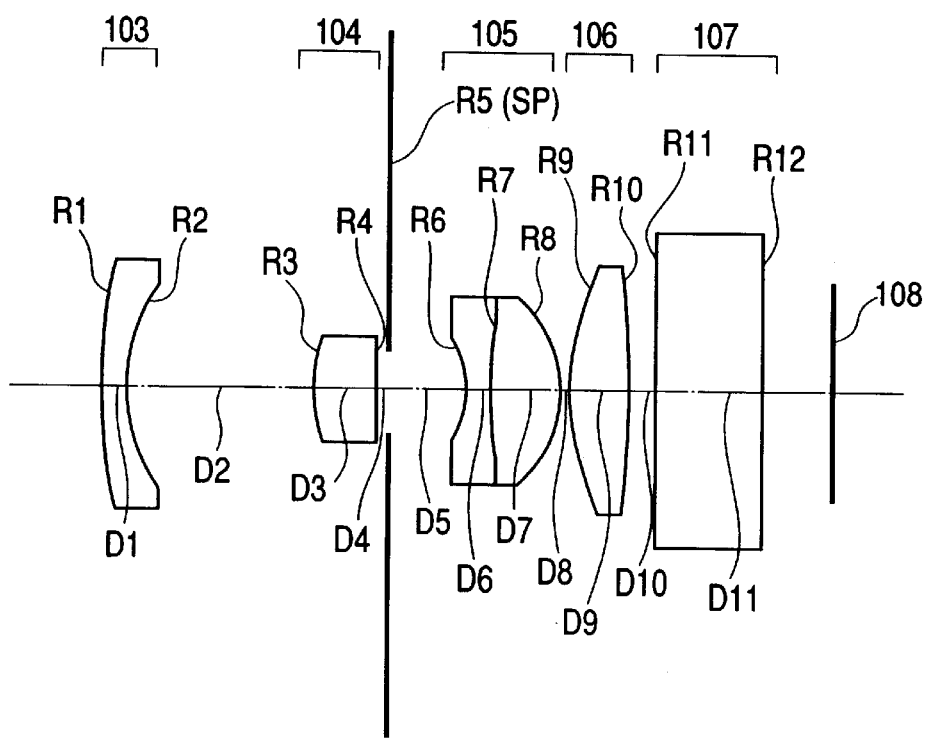
FIG. 7 is a sectional lens view of an objective lens according to Numerical Example 6.
Figure 8:
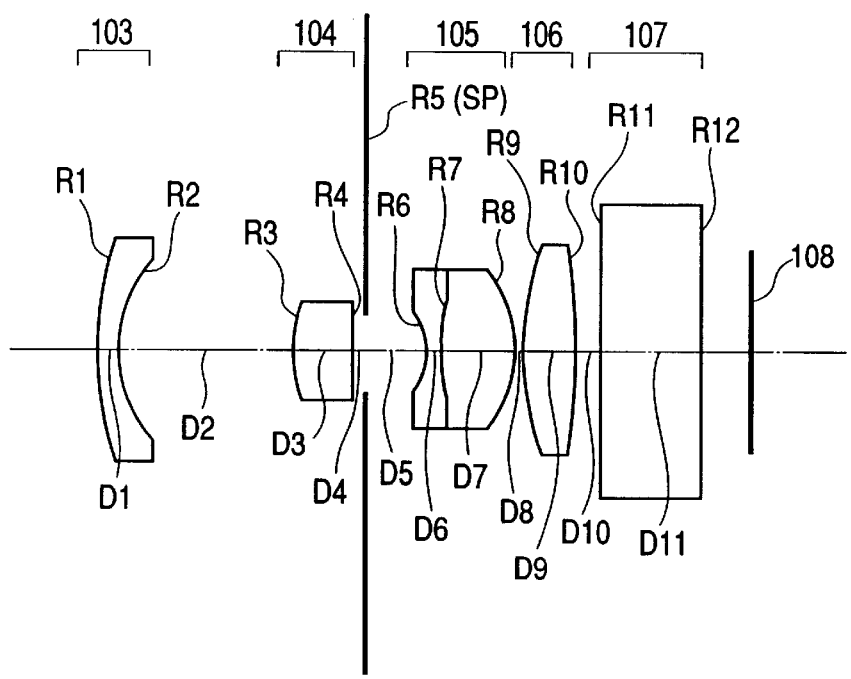
FIG. 8 is a sectional lens view of an objective lens according to Numerical Example 7.
Figure 9:
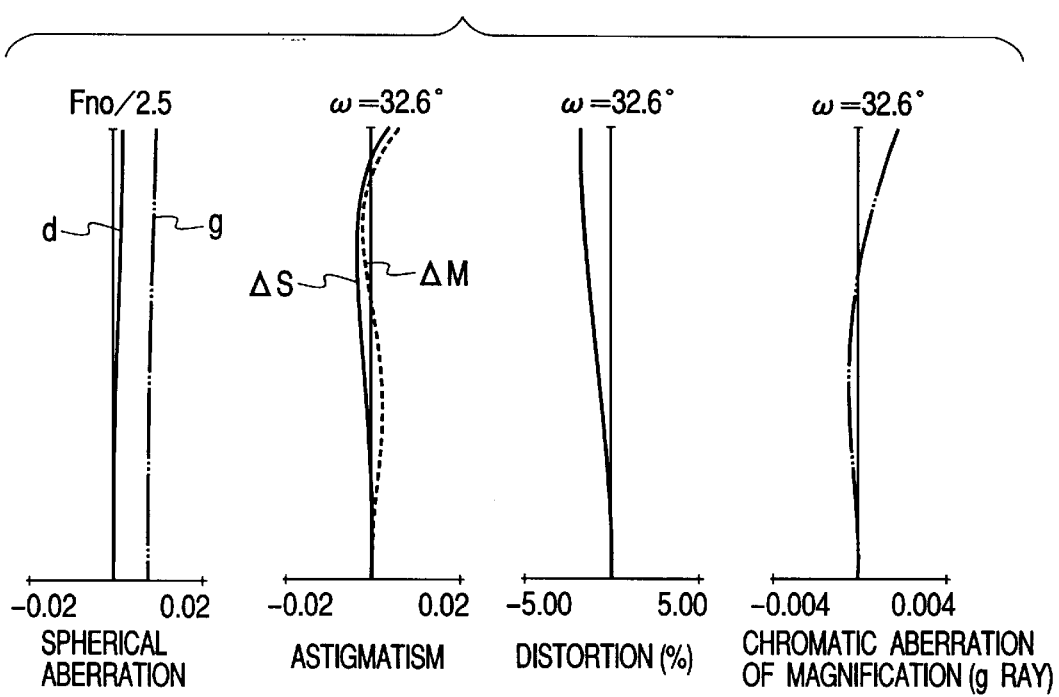
FIG. 9 is a representation of various aberrations of an objective lens according to Numerical Example 1.
Figure 10:
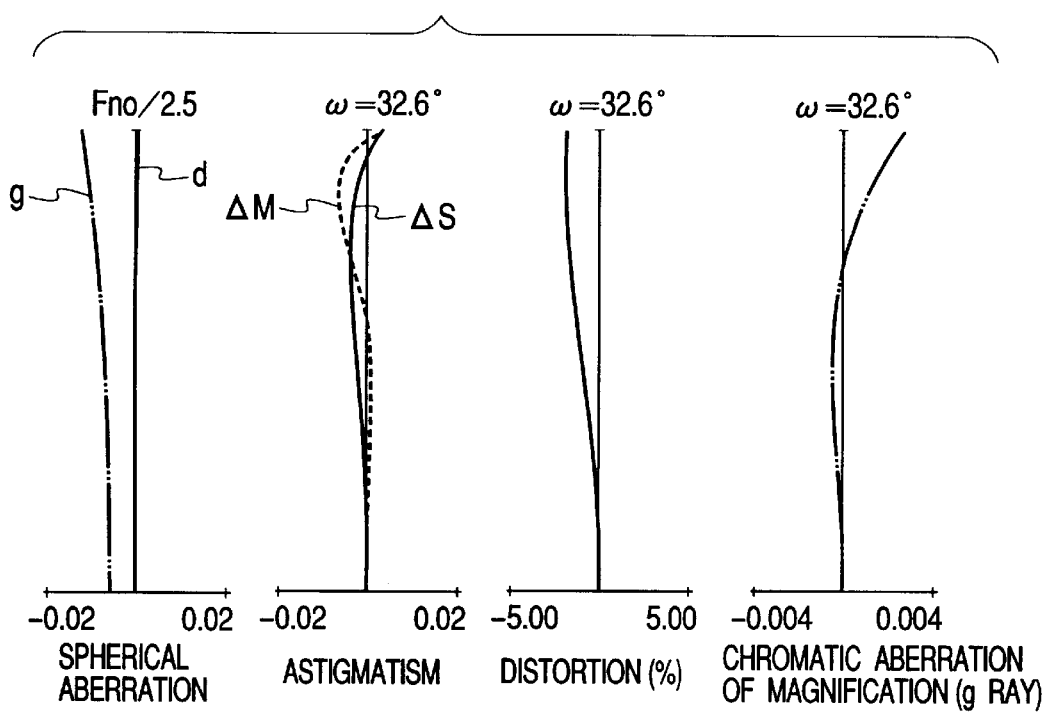
FIG. 10 is a representation of various aberrations of an objective lens according to Numerical Example 2.
Figure 11:
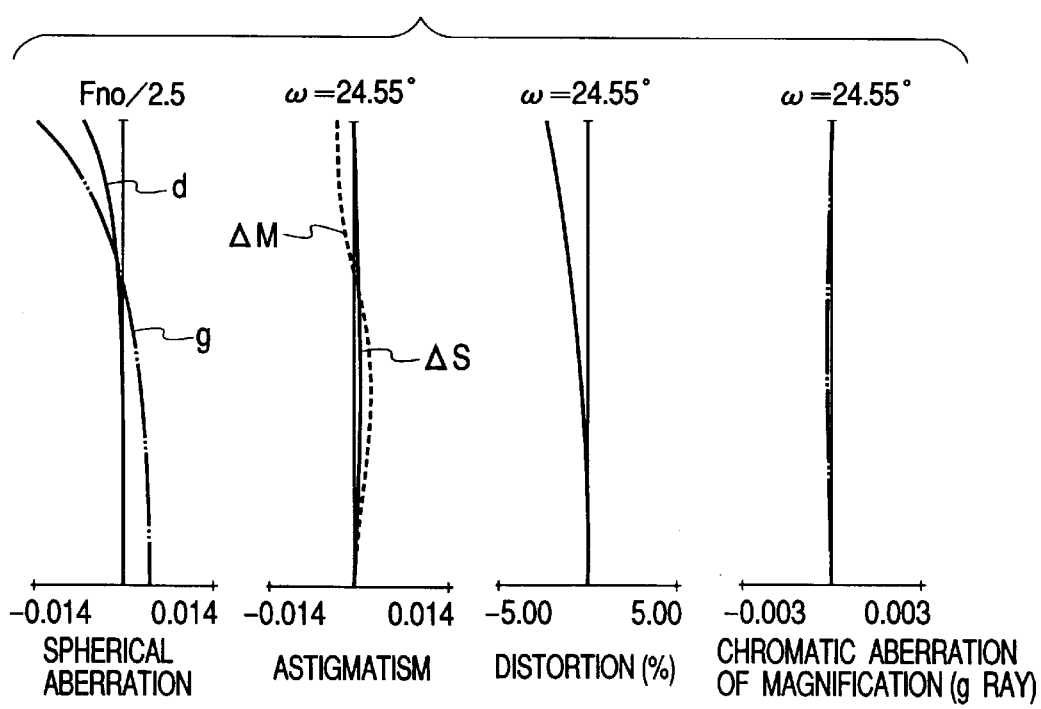
FIG. 11 is a representation of various aberrations of an objective lens according to Numerical Example 3.
Figure 12:
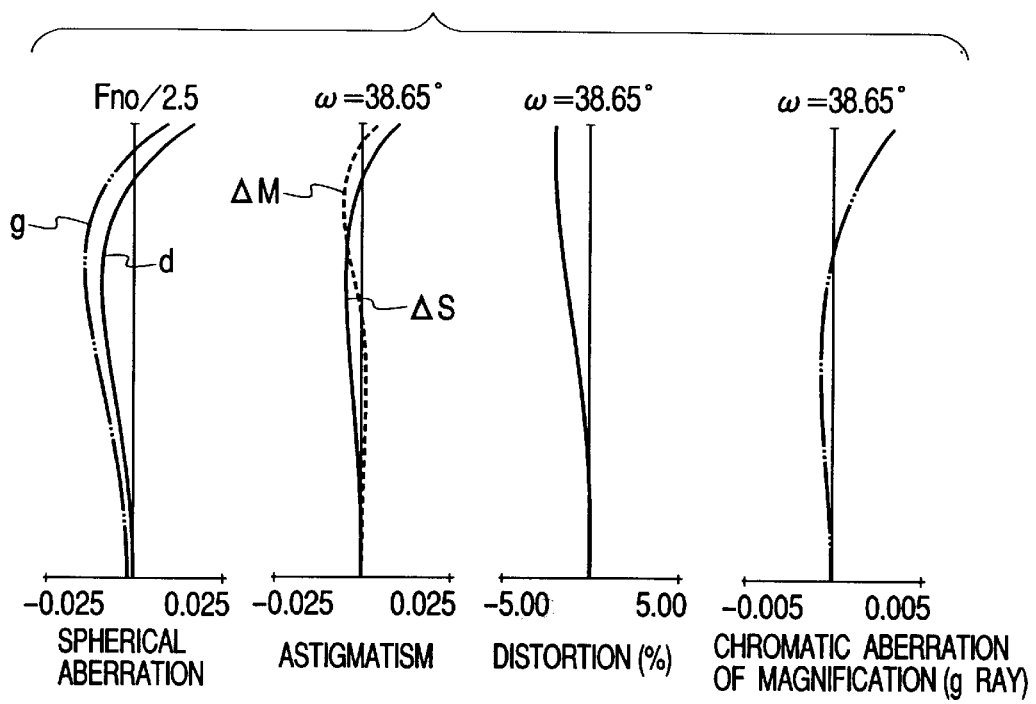
FIG. 12 is a representation of various aberrations of an objective lens according to Numerical Example 4.
Figure 13:
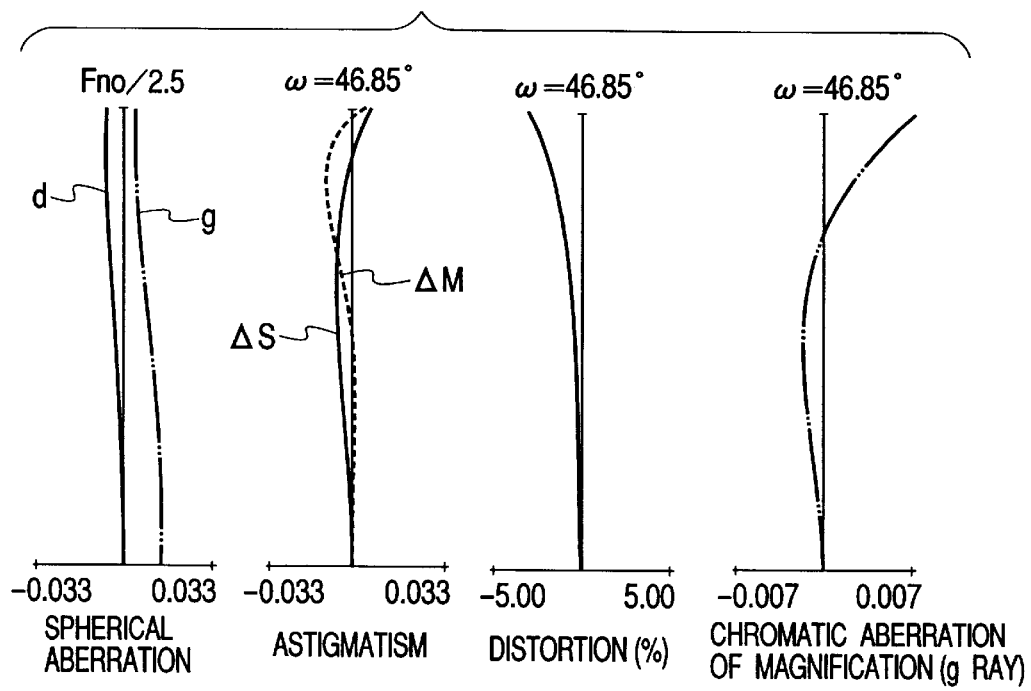
FIG. 13 is a representation of various aberrations of an objective lens according to Numerical Example 5.
Figure 14:
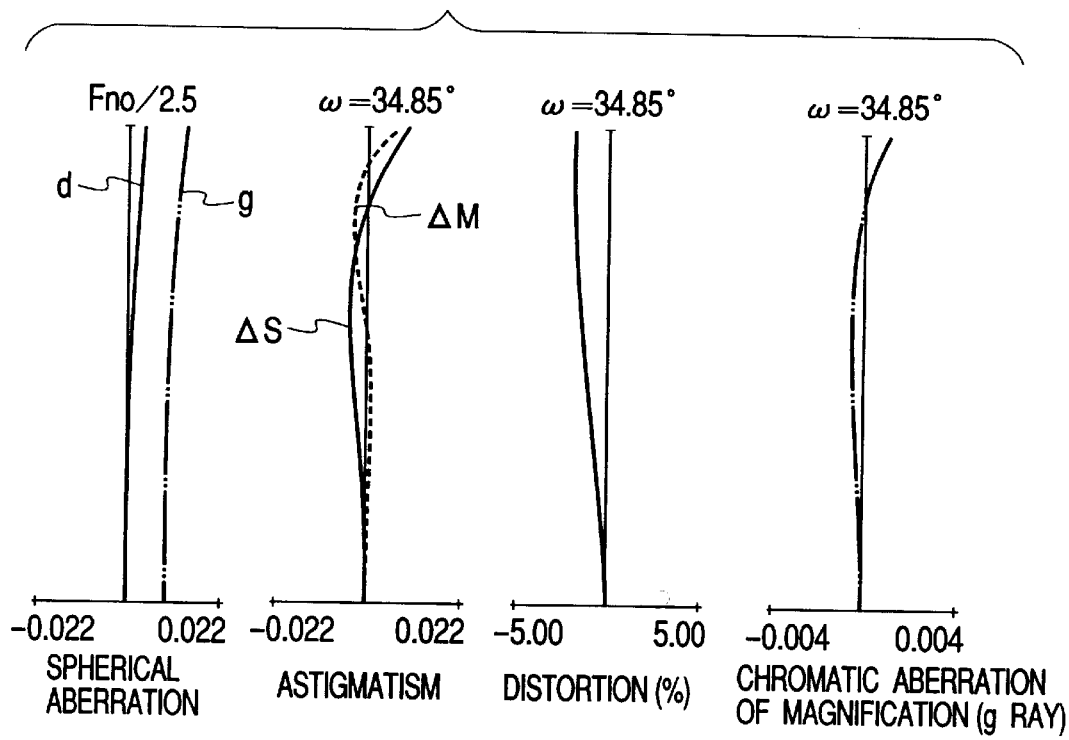
FIG. 14 is a representation of various aberrations of an objective lens according to Numerical Example 6.
Figure 15:
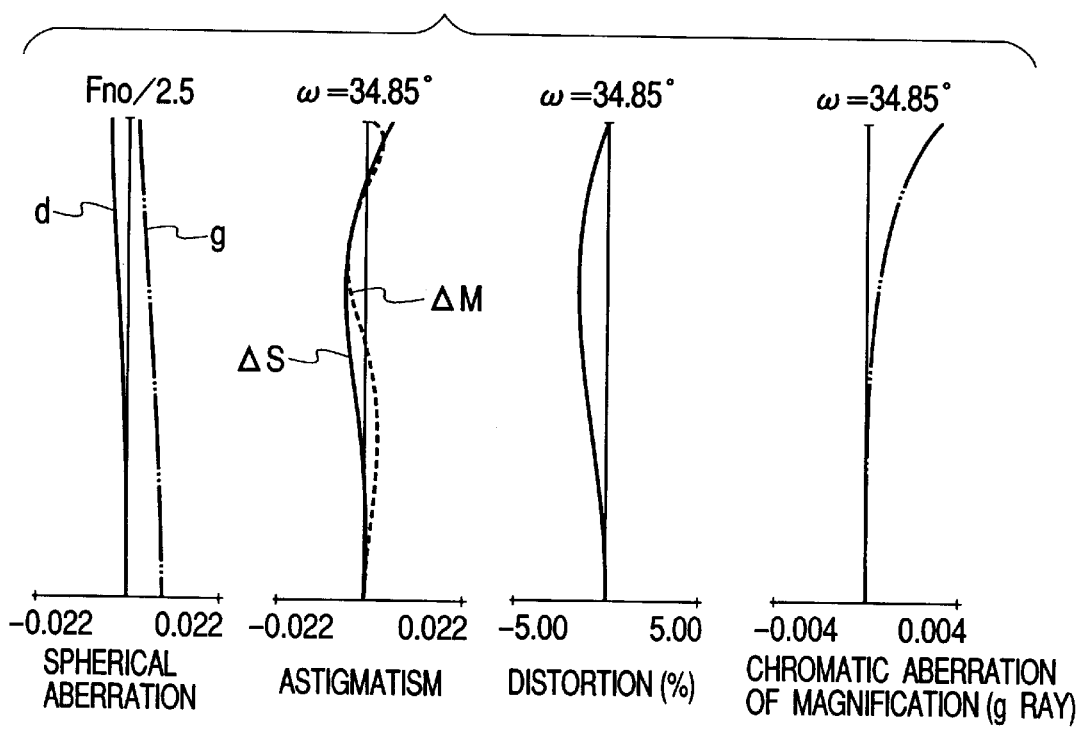
FIG. 15 is a representation of various aberrations of an objective lens according to Numerical Example 7.
Figure 16A:
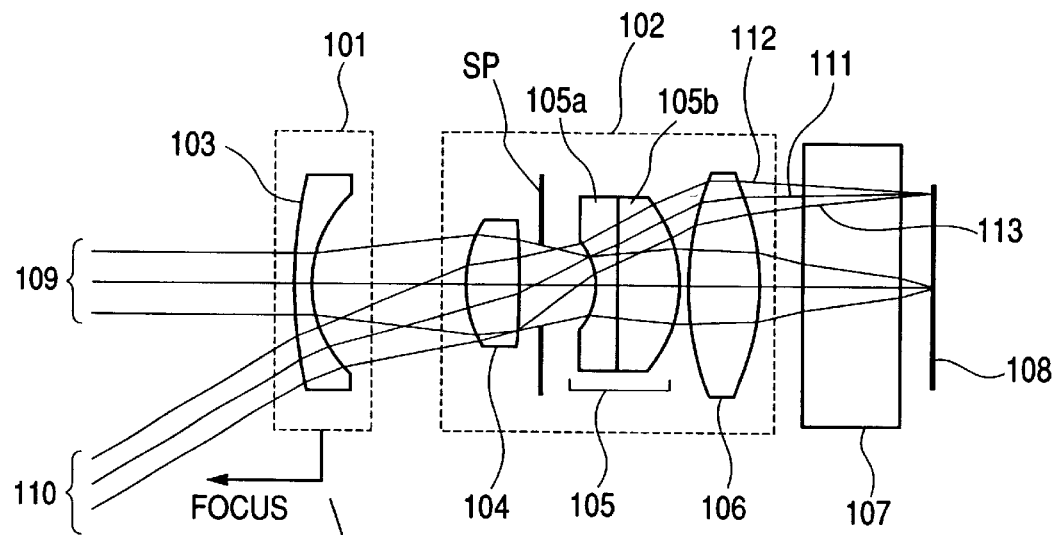
FIGS. 16A and 16B are illustration of the infinite focus state and the collapse state of the objective lens of FIG. 1, respectively.

FIG. 1 is an illustration of the basic configuration of one embodiment of objective lens according to the present invention. FIGS. 2 to 8 are sectional views of lenses according to the Numerical Examples 1 to 7 mentioned later. FIGS. 9 to 15 are representations of various aberrations in the Numerical Examples 1 to 7. Moreover, FIG. 16A is a drawing showing the infinite focus state of the objective lens shown in FIG. 1 and FIG. 16B (not shown) is the collapse state of the objective lens collapsed into the camera body. And, FIGS. 17A, 18A, 19A, 20A and 21A are sectional lens views of the objective lens according to Numerical Examples 8 to 12 during the infinite focus state. FIGS. 17B, 18B, 19B, 20B and 21B are sectional lens views of the objective lens according to Numerical Examples 8 to 12 during the collapse state. FIGS. 22A, 23A, 24A, 25A and 26A are representations of various aberrations of the objective lens according to Numerical Examples 8 to 12 during the infinite focus state. FIGS. 22B, 23B, 24B, 25B and 26B are representations of various aberrations of the objective lens according to Numerical Examples 8 to 12 during the state of focused to a short-distance object at a magnification of $\beta=-0.058$. Incidentally, the numerical data indicated in pairs of Numerical Examples of 1 and 8, 2 and 9, 4 and 10, 6 and 11 are in common.

In individual drawings, Numerals 101 and 102 denote the front group of negative refractive power and the rear group of positive refractive power. The front lens unit 101 has a first lens unit 103 of negative refractive power, the rear lens unit 102 has a second lens unit 104 of positive refractive power, a third lens unit 105 of negative refractive power and a fourth lens unit 106 of positive refractive power. Numeral 107 denotes a filter unit (glass block) composed of a crystal low-pass filter, an infrared cut filter and like filters. SP denotes a aperture stop, provided between the first lens unit 103 and the second lens unit 104 or between the second lens unit 104 and the third lens unit 105. Numerals 108, 109, 110 and 111 denote an imaging surface on which an image pickup element such as CCD is disposed, an on-axis light flux, an off-axis light flux and the principal ray of an off-axis flux 110, respectively. Numerals 112 and 113 denote marginal rays of an off-axis light flux 110, corresponding to the upper and lower rays, respectively.

An objective lens according to this embodiment is a retro-focus type lens configuration comprising a front lens unit 101 of negative refractive power and a rear lens unit 102 of positive refractive power. The first lens unit 103 of negative refractive power consists only of a first negative lens in the shape of a meniscus with the concave surface toward the image field side. The second lens unit 104 of positive refractive power consists only of a second positive lens with the convex surface toward the object side. The third group 105 of negative refractive power consists of a composite lens joined of a third negative lens 105a and a fourth positive lens 105b in the shape of a meniscus with the concave surface as a whole toward the object side or two independent flat lenses. The fourth lens unit 106 of positive refractive power consists of a single positive fifth lens with both lens surfaces being convex. The total system of an objective lens comprises 4 groups and 5 pieces.

As mentioned above, for widening the photographing field angle and making the exit pupil sufficiently apart from the image field, it is preferable to set the total system to a retro-focus type. Besides, for shortening the total lens length, it is preferable to minimize the number of lenses. The present invention comprises a front lens unit 101 consisting of a single negative lens and a rear lens unit 102 having a positive fifth lens as the final lens. Besides, to keep the exit pupil apart from the image field without intensifying the refractive power of the final lens excessively, a fourth lens 105b or a negative composite lens as the lens directly in front of the final lens has the surface on the image field side set to a convex surface.

Besides, to improve the image field characteristics, with the objective lenses shown in Numerical Examples 1 to 11, a negative composite lens is disposed in the rear lens unit 102. Because of comprising a single lens, the front lens unit 101 has the Petzval sum uncorrected within itself. Consequently, by setting a negative refractive power in the rear lens unit 102, the front lens unit 101 and the rear lens unit 102 are canceled out to reduce the Petzval sum in the total system. Especially, by pasting the third and fourth lenses from the object side together to make a composite lens among five lenses of a negative, a positive, a negative, a positive and a positive lenses in sequence from the object side, a configuration without a highly eccentrically sensitive air clearance part are implemented. Thereby, the deteriorations of imaging performances due to manufacturing errors, assembling errors or the like is prevented throughout the total system.

Besides, an objective lens according to this embodiment has a stop SP provided between the first lens unit 103 and the second lens unit 104 or between the second lens unit 104 and the third lens unit 105. For keeping the exit pupil apart from the image field, it is preferable that the front lens unit of retro-focus type is disposed on the object side to the stop SP and an objective lens according to this embodiment has the stop SP disposed on the image field side from the first lens unit. Besides, when the stop is disposed between the third lens unit and the fourth lens unit, an excessively strong refractive power of the fourth lens unit is required for keeping the exit pupil apart from the image field while shortening the total lens length. As a result, the Petzval sum cannot be reduced. Thus, for shortening the total lens length and for keeping the exit pupil apart from the image field, the stop SP is disposed between the first lens unit and the second lens unit or between the second lens unit and the third lens unit.

Besides, the first lens is set to a meniscus lens with a concave surface on the image field side. For keeping the exit pupil far of f from the image field, action of refracting an off-axis chief ray must be afforded to the first lens to some extent. Thus, a certain degree of negative refractive power is necessary for the first lens, but as a result, a barrel-shaped aberration is likely to occur in the first lens. In minimizing the occurrence of this aberration, minimizing the angle of the principal ray of an off-axis light flux incident to a lens surface is effective. For example, if the first lens has a concentric curvature radius, the incident angle of an off-axis ray can be set to 0, but a certain negative refractive power cannot be afforded in this case unlike the above. Thus, in an object lens according to this embodiment, the curvature radius of the surface on the object side is made greater and that of the surface on the image field side is made smaller to intensify the negative refractive power in contrast to a concentric shape, but the occurrence of aberration is minimized by keeping a meniscus shape with a strongly concave surface on the image field side. And correction of aberrations is made so as to cancel this in the rear lens unit 102.

Besides, in an objective lens according to this embodiment, the total lens length is further shortened by applying an aspherical surface to at least one lens of the fourth lens unit 106 as the final lens and a better imaging performance is obtained. With the above 4 group 5 piece configuration, employing a spherical surface alone has a limit in making the exit pupil sufficiently apart from the image field and shortening the total lens length. In shortening the total lens length with the exit pupil kept apart from the image field, especially the refractive power of the final lens must be intensified and thereby a barrel-shaped aberration and a under aberration of the image field occur. In an objective lens according to the present invention, shortening the total lens length with the exit pupil kept sufficiently apart from the image is further made easier by applying an aspherical surface to the final lens than in the configuration of a spherical lens alone.

In the case of setting an aspherical surface for the final lens, employing such a shape that the convergent action is weakened from the optical axis toward the marginal portion is effective in correcting a barrel-shaped aberration. This is a shape as slackening the curvature radius in a convex surface. With such an arrangement, both the curvature radius on the surface of lens and the incident angle of a ray act so as to weaken the refraction for an off-axis ray, so that the barrel-shaped aberration is corrected. Besides, since the imaging action is weakened for an off-axis light flux, there is a tendency of correcting the under curvature of field. Thus, in an objective lens according to the present invention, both the aberration and the curvature of field are corrected with the total lens length shortened by applying such an aspherical surface to the final lens. Incidentally, the marginal refractive power is relatively weakened as compared with the neighborhood of the optical axis on account of the above aspherical shape, but the refractive power of the fourth lens unit 106 itself is intensified by introduction of an aspherical surface, so that aberrations can be corrected with the exit pupil kept sufficient apart from the image field.

Besides, in an objective lens according to the present invention, occurrence of comatic aberration is suppressed while the angle of field widened by appropriately setting up the lens shape of the second lens unit 104. After an off-axis light flux is refracted through the first lens unit 103, the principal ray is incident to the second lens unit 104 at a certain angle with the optical axis. At this time, a comatic aberration occurs unless the lens surface of the second lens unit 104 has no concentric curvature radius. Thus, in this embodiment, occurrence of a comatic aberration is reduced by making a relatively small curvature radius while the lens surface on the object side of the second group 104 remaining convex.

Furthermore, in an objective lens according to this embodiment, a far better imaging performance is implemented even when the total lens length is shortened while the angle of field widened, by applying at least one aspherical surface to the second lens unit 104. After an off-axis light flux is refracted through the first lens unit 103, the principal ray is incident on the second lens unit 104 at a certain angle with the optical axis. At this time, a comatic aberration occurs unless the lens surface of the second lens unit 104 has no concentric curvature radius. Thus, in objective lens of this embodiment, occurrence of a comatic aberration is reduced though the angle of field remains wide by setting the lens surface on the object side of the second lens unit 104 to a relatively small curvature radius. Besides, in an on-axis light flux, a spherical over aberration occurs through the concave surface on the image side of the first lens unit 103. If the lens surface on the object side of the second lens unit 104 is set to a convex surface, a spherical under aberration occurs and the spherical aberration occurring in the first lens unit 103 can be corrected. If the curvature of the lens surface on the object side of the second lens unit 104, however, is sharpened for the correction of a comatic aberration with the angle of field kept wide, then a spherical under aberration may occur to greater extent in the second lens unit 104 than required. Though occurring in the concave surface of the third lens unit 105, the spherical over aberration cannot be corrected too great a degree of spherical under aberration in the second lens unit 104 and accordingly the correction becomes incomplete in the total system. Thus, in this embodiment, the spherical under aberration is corrected by establishing such an aspherical surface that the convergence action is weakened from the optical axis toward the margin in the second lens unit 104. Since an on-axis land ray is refracted at a position apart from the optical axis on any one surface of the second lens unit 104, an aspherical surface to be provided for the correction of a spherical aberration is effective even on any lens surface of the second lens unit 104.

Besides, for a wider photographing field angle, it is effective to apply at least one aspherical surface also to the first lens unit 103 in addition to the fourth lens unit 106. At a fixed value of total lens length, the refractive power of the first lens unit 103 must be intensified with a wider photographing field angle. In the first lens unit 103, a barrel-type aberration occurs, but an excessive strength of refractive power results in lack of correction even if an aspherical surface is applied to the fourth lens unit 106. In such cases, applying an aspherical surface to the first lens unit 103 enables a aberration to be well corrected while the angle of field in the objective lens remaining wider. As mentioned above, the first lens unit 103 consists of a meniscus lens with the negative refractive power intensified in contrast to the concentric shape. Thus, in the lens surface of the first lens unit 103, the principle ray is refracted at a greater incident angle with more eccentric off-axis light flux. For the correction of a barrel-shaped aberration, it is preferable to employ such an aspherical surface that the divergent action is gradually weakened from the optical axis toward the marginal portion. Namely, it is preferable to make the lens surface on the object side of the first lens unit 103 into an aspherical surface shape with its curvature radius sharpened from the optical axis toward the marginal portion and the one on the image field side into an aspherical surface shape with its curvature radius slackened from the optical axis toward the marginal portion.

Figure 21A:
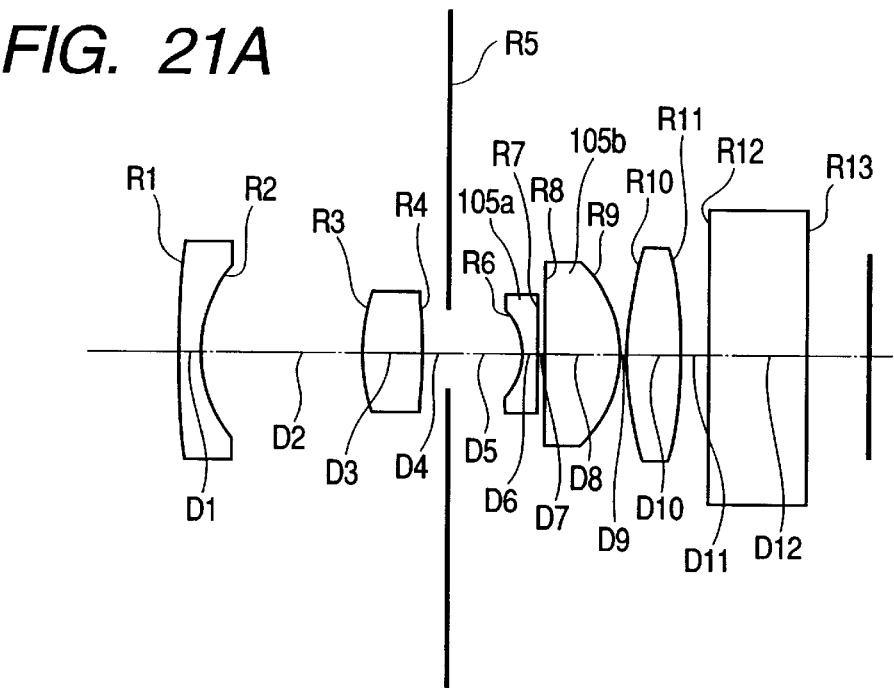
FIGS. 21A and 21B are sectional lens views of an objective lens according to Numerical Example 12.
Figure 21B:
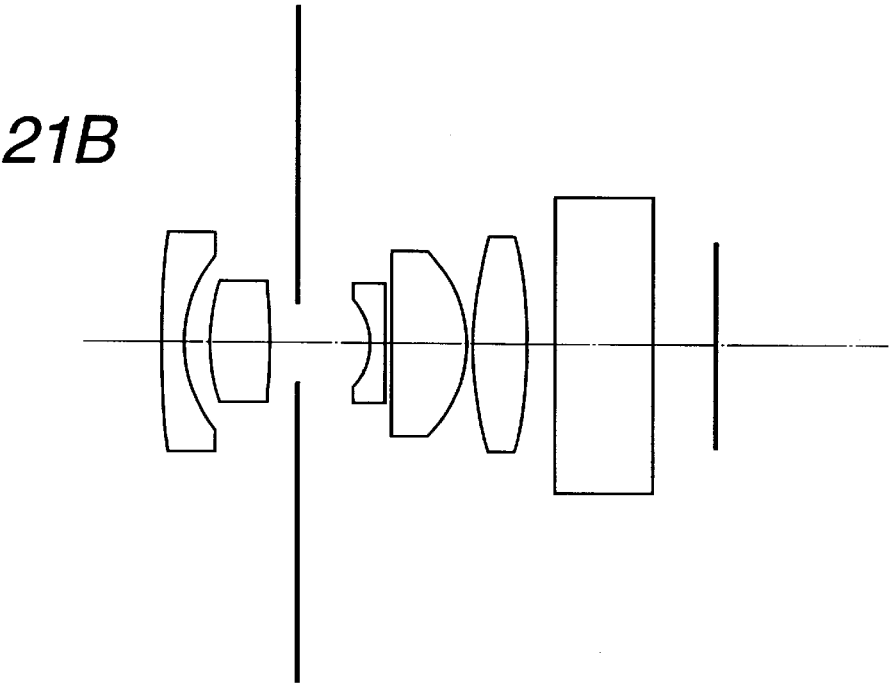
Figure 22A:
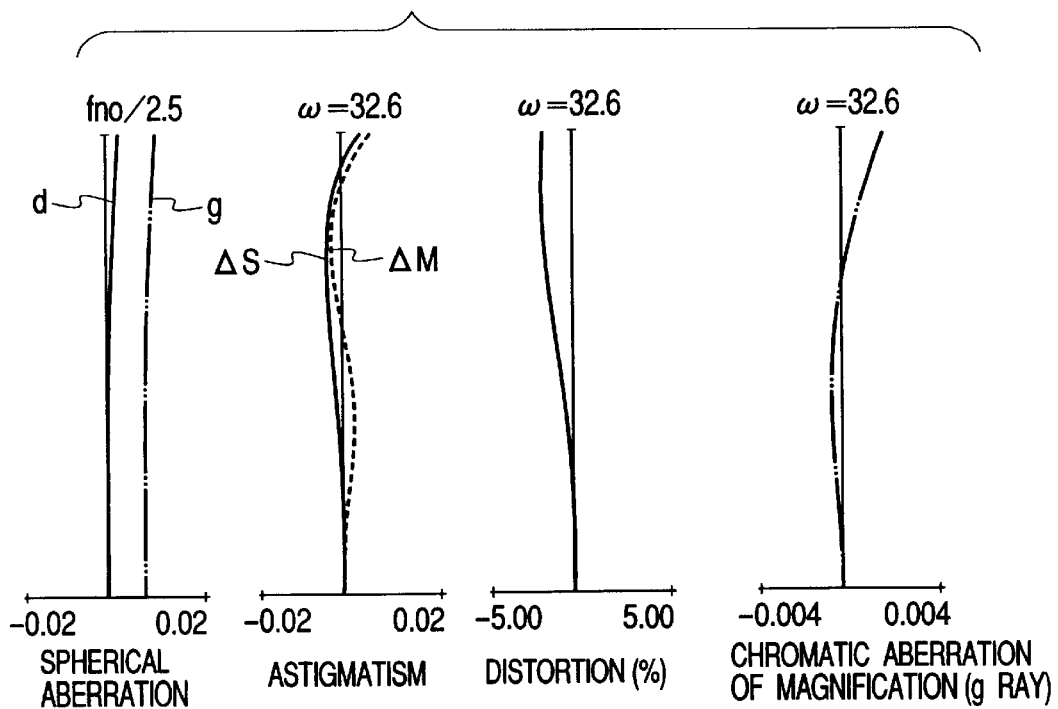
FIGS. 22A and 22B are representations of various aberrations of an objective lens according to Numerical Example 8.
Figure 22B:
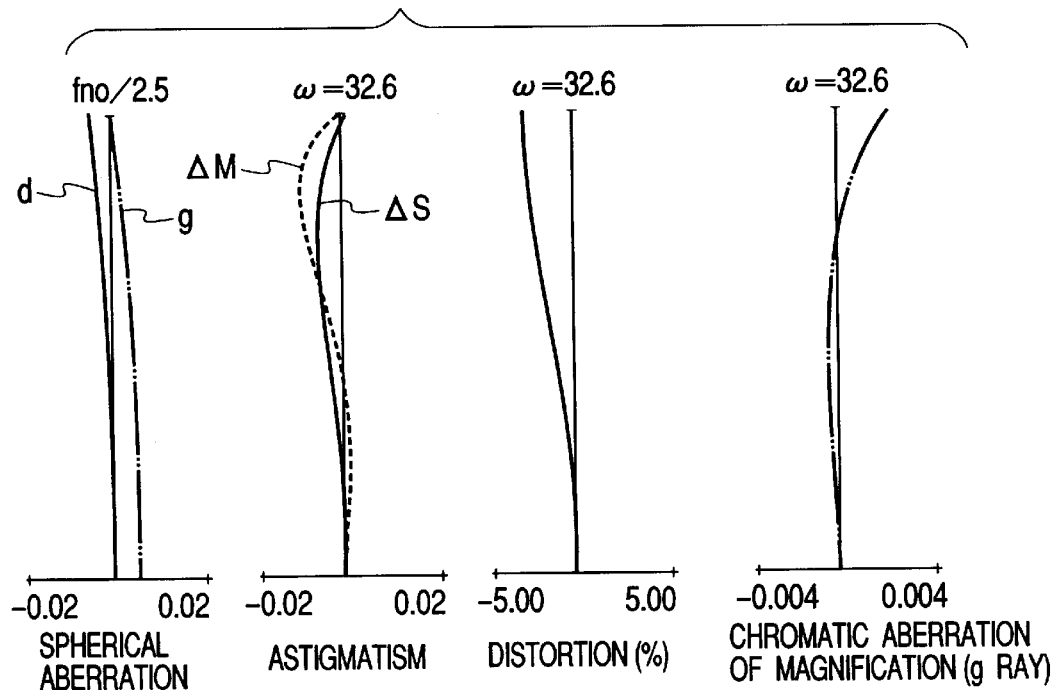
Figure 23A:
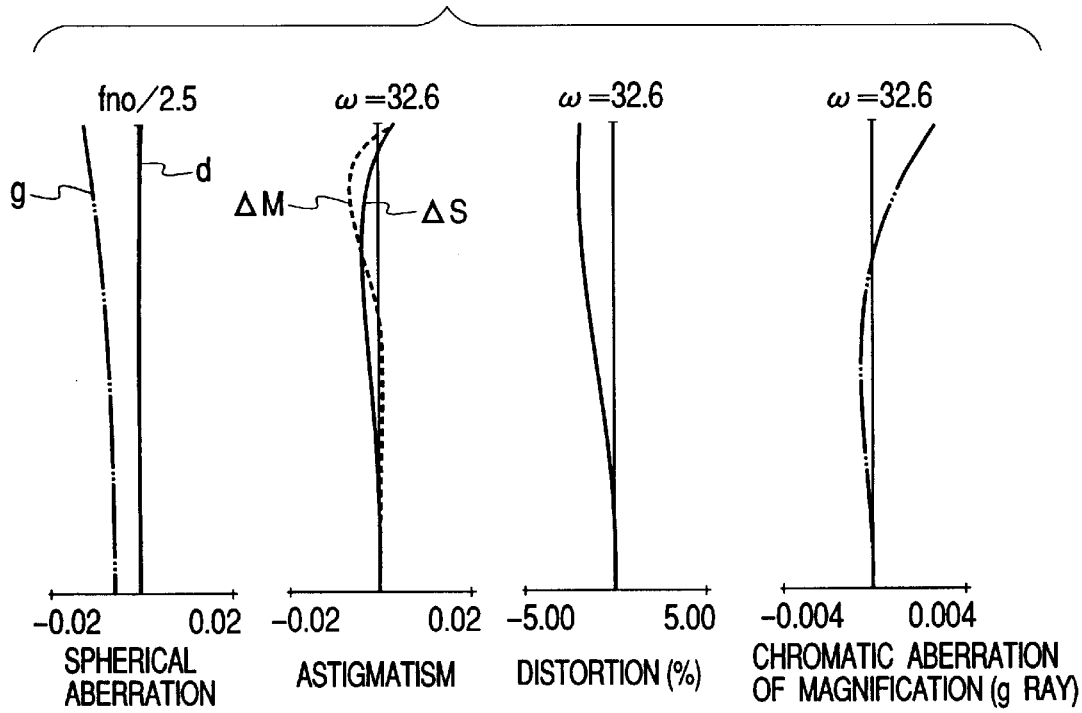
FIGS. 23A and 23B are representations of various aberrations of an objective lens in Numerical Example 9.
Figure 23B:
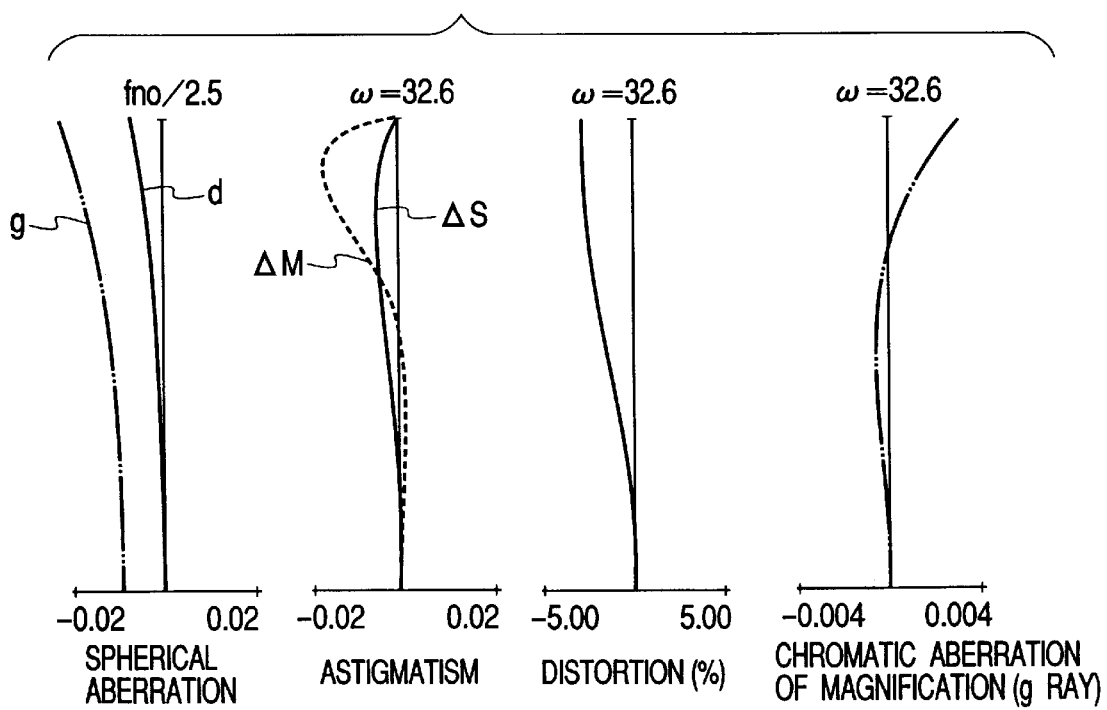
Figure 24A:
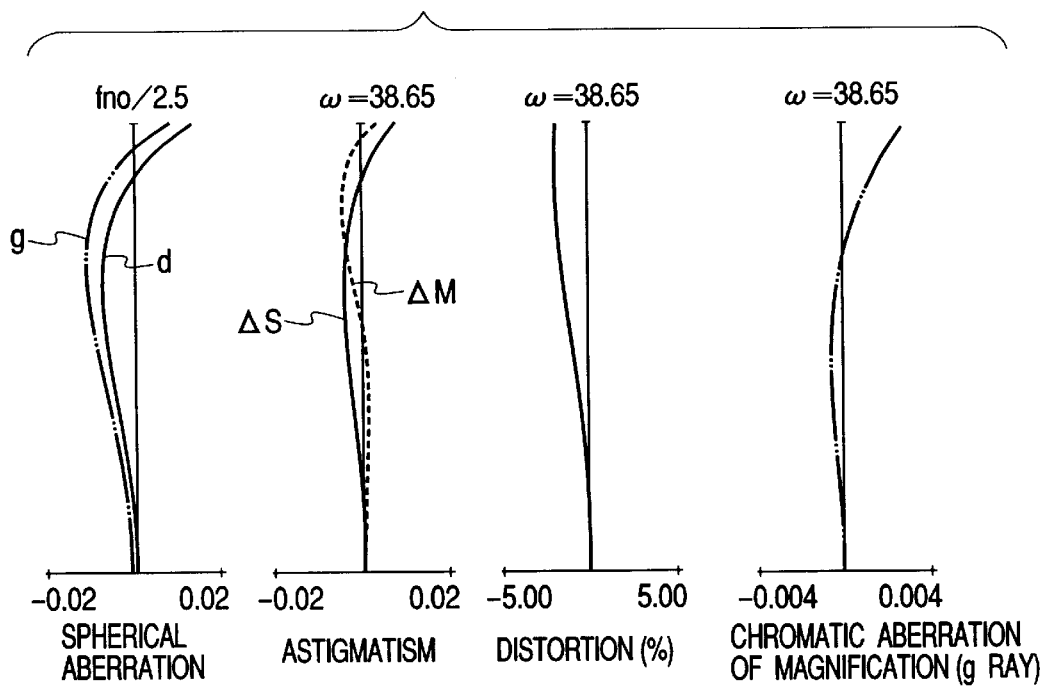
FIGS. 24A and 24B are representations of various aberrations of an objective lens in Numerical Example 10.
Figure 24B:
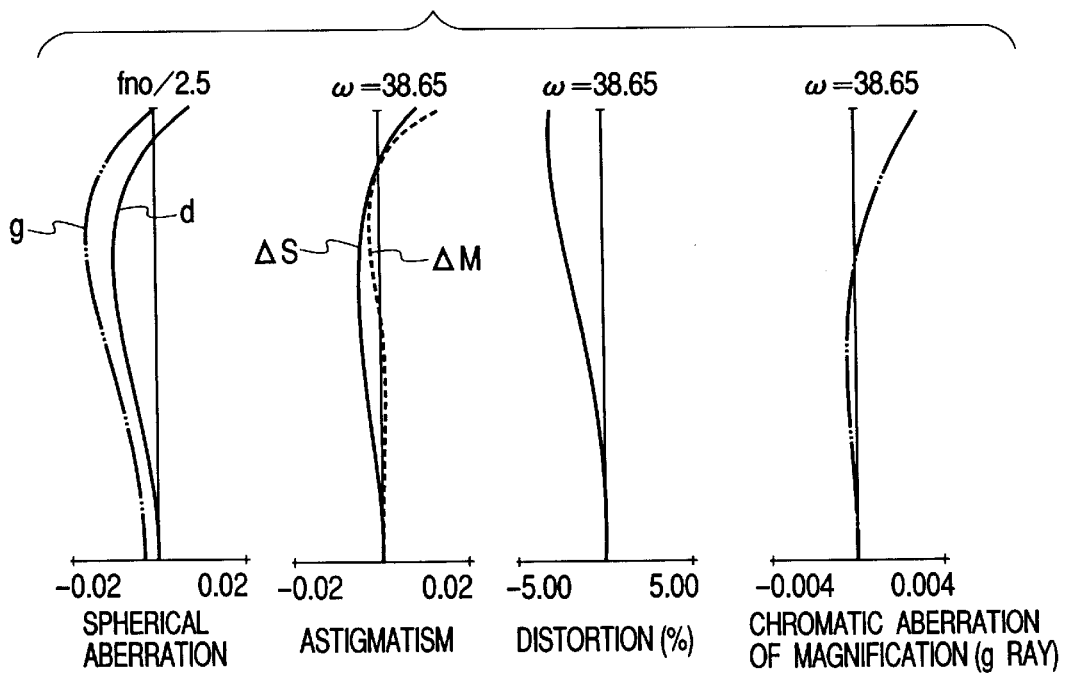
Figure 25A:
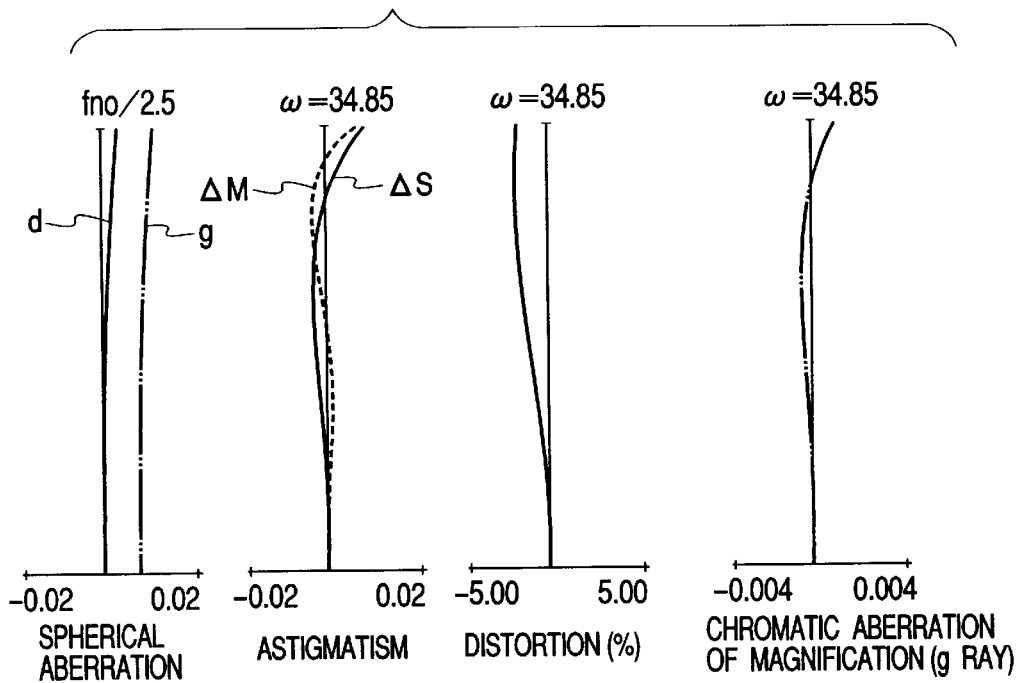
FIGS. 25A and 25B are representations of various aberrations of an objective lens in Numerical Example 11.
Figure 25B:
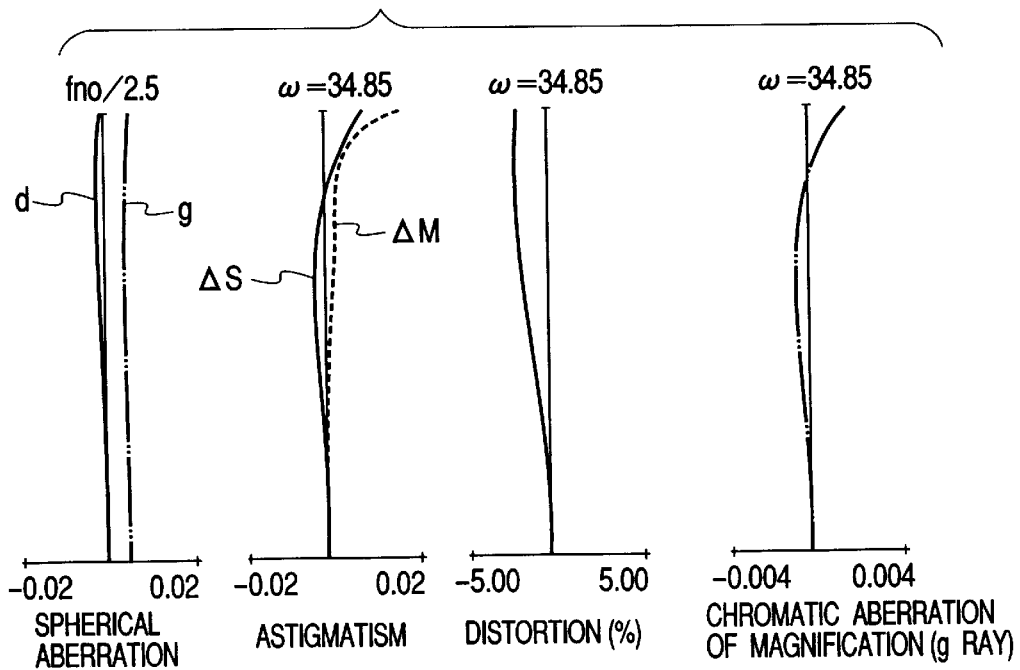
Figure 26A:
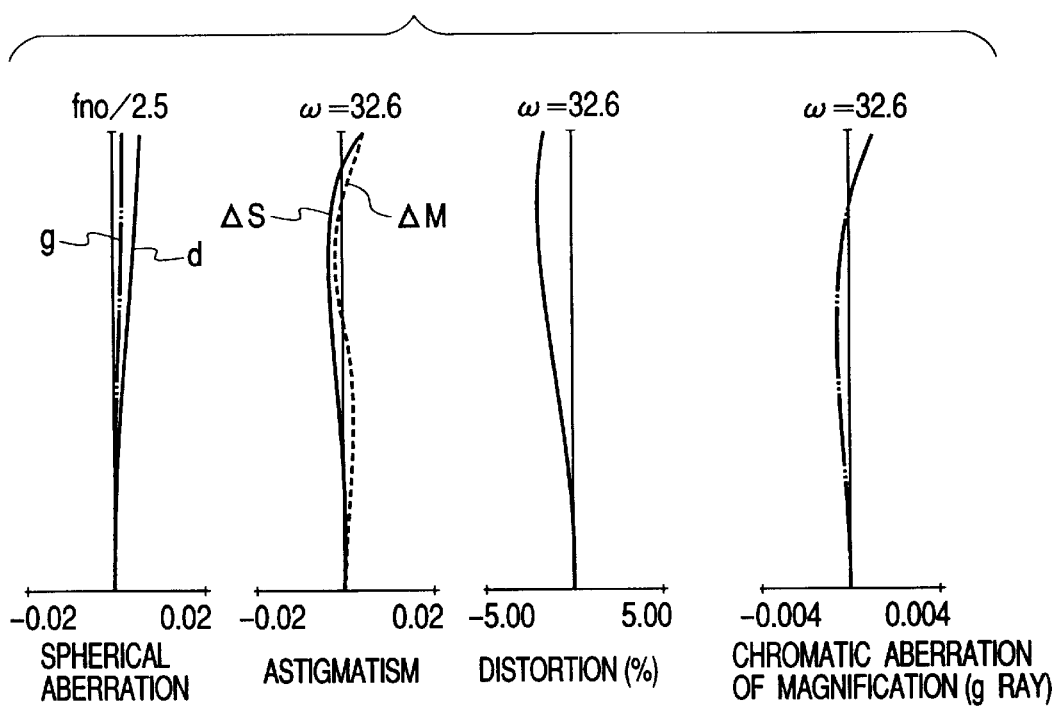
FIGS. 26A and 26B are representations of various aberrations of an objective lens in Numerical Example 12.
Figure 26B:
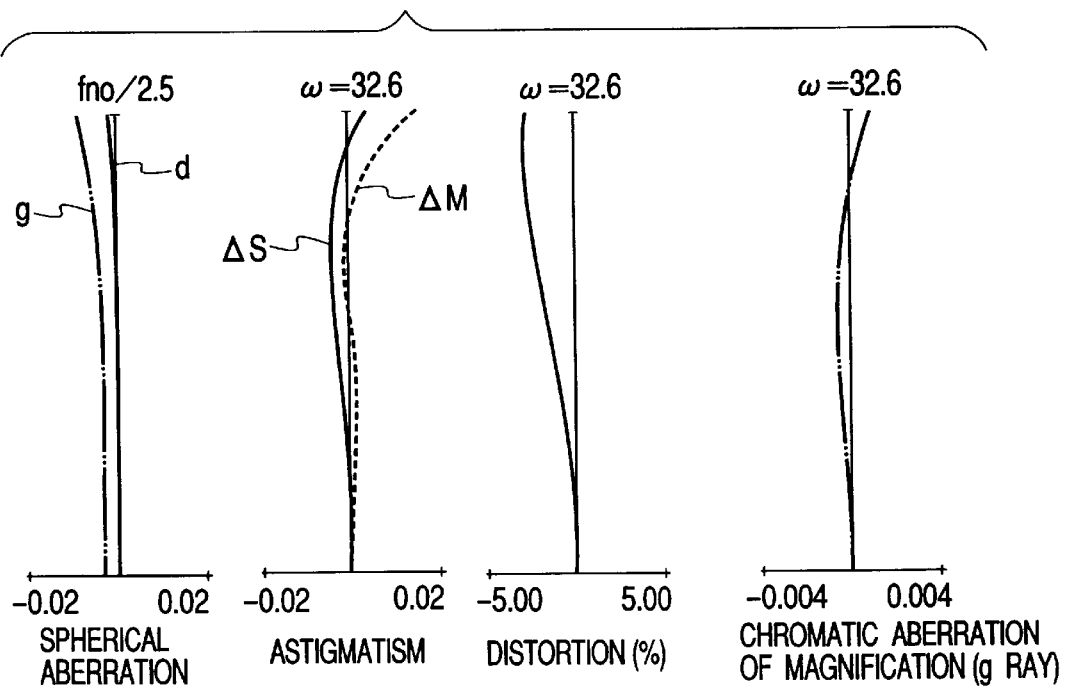

Incidentally, even if the composite lens of the third lens unit 105 is separated to make the whole into a 5 piece configuration of simple lenses as shown in FIGS. 21A and 21B, shortening the total lens length and improving the optical performance are compatible with the exit pupil remaining sufficiently apart from the image field. In general, however, the air lens formed by separating the third lens unit is highly sensitive and characterized in that curvature of field is likely to occur in the presence of manufacturing errors, assembling errors or the like. Thus, only if manufacturing errors, assembling errors and the like are controllable, the configuration shown in FIGS. 21A and 21B is effective as an objective lens.

Besides, in an objective lens according to this embodiment, only a single lens of the first lens unit 103 is used for focusing lens. Thereby, the focusing lens can be constructed at an extremely light weight, so that the focusing performance excellent in response is obtained. In a digital still camera or the like using a solid image pickup element, there is employed a focusing method by positioning a focusing lens at the position of maximum in AF signal after reading an AF signal for each drive distance at definite intervals while driving the focusing lens over the whole focal range extending from an infinite object to a short distance object. In such a focusing method, excellency in the response of a focusing lens is preferable for raising the focusing speed and is important especially where a reversal motion of driving direction is included. Besides, since the consumed power needed for the drive is small enough, this method leads to a longer life of service in a camera operated with a battery.

Figure 16B:
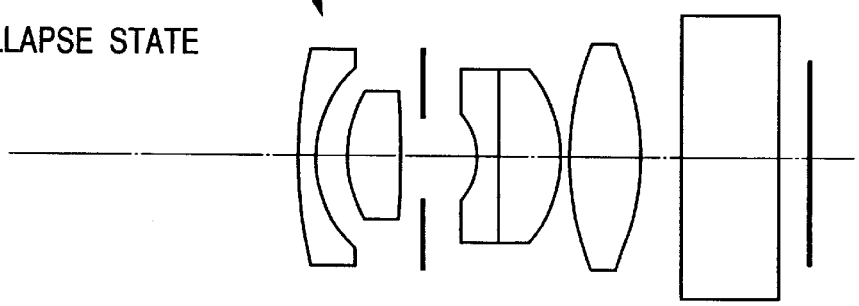
Figure 17A:
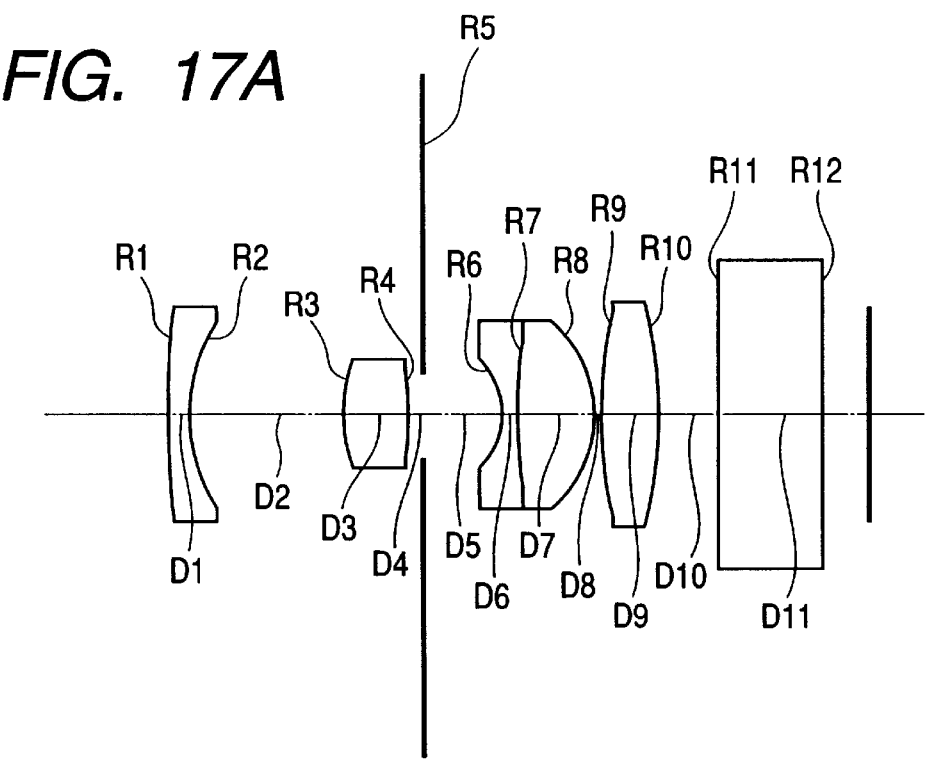
FIGS. 17A and 17B are sectional lens views of an objective lens according to Numerical Example 8.
Figure 17B:
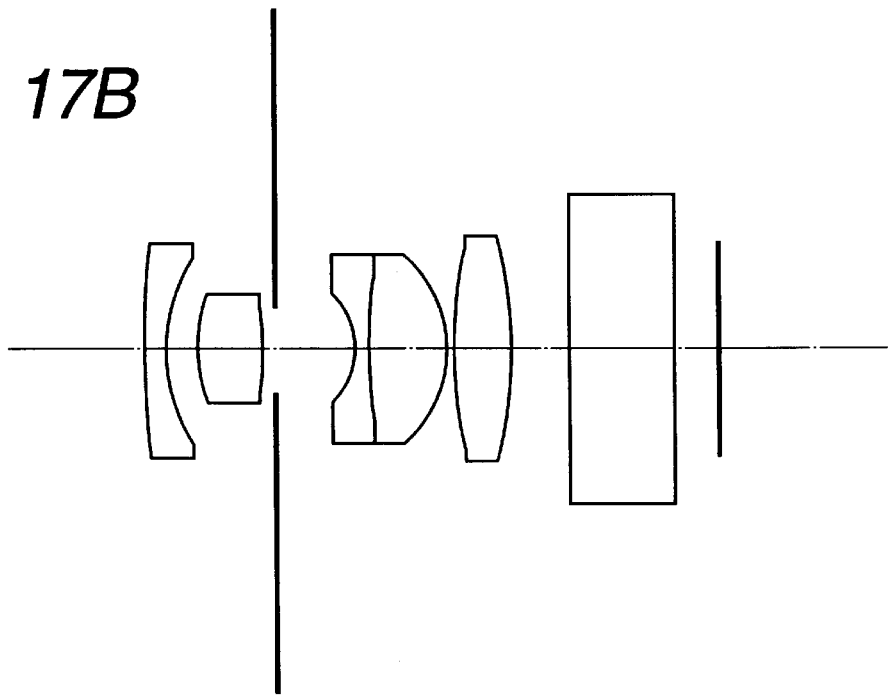
Figure 18A:
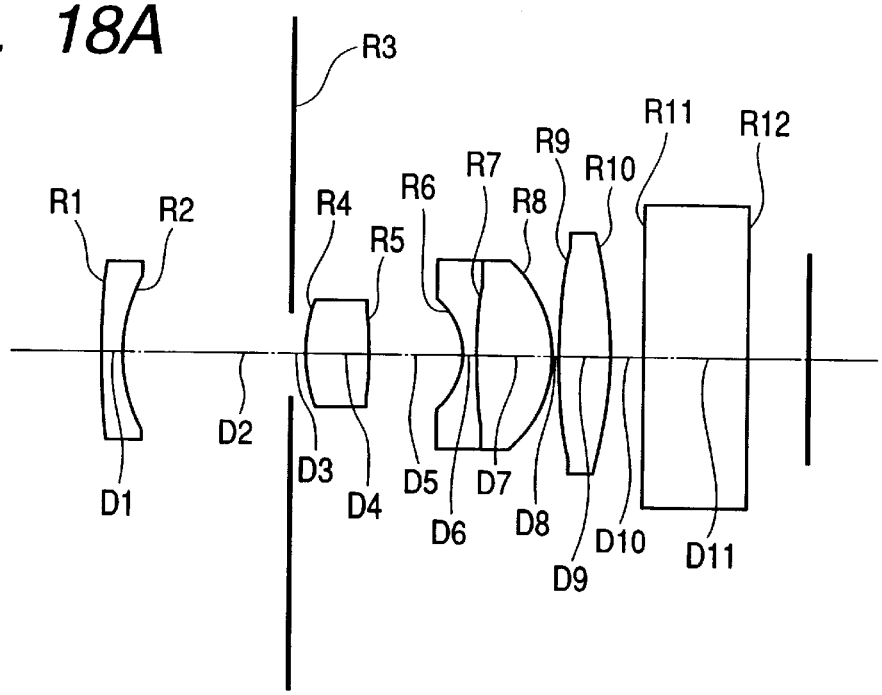
FIGS. 18A and 18B are sectional lens views of an objective lens according to Numerical Example 10.
Figure 18B:
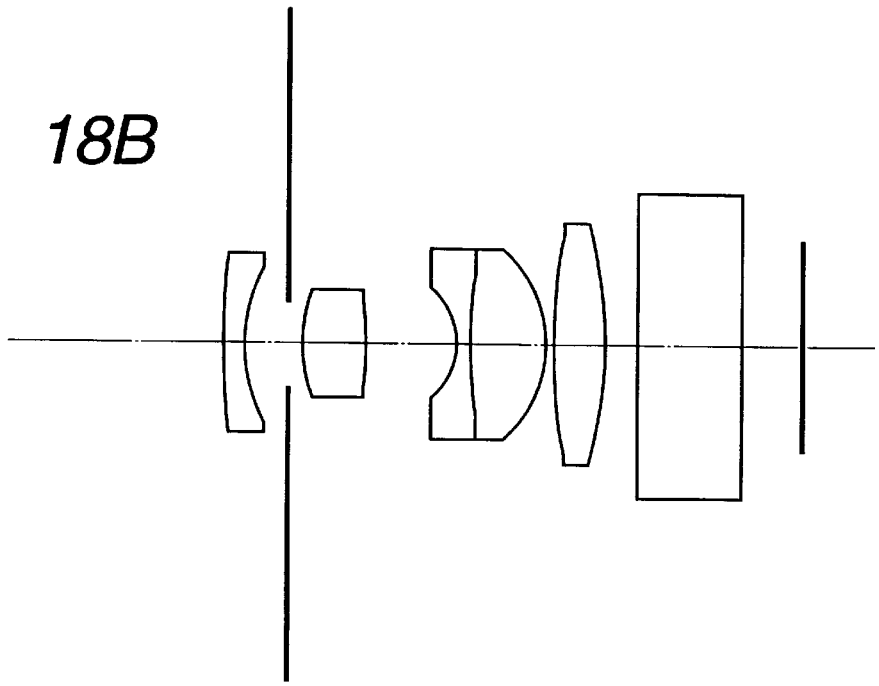
Figure 19A:
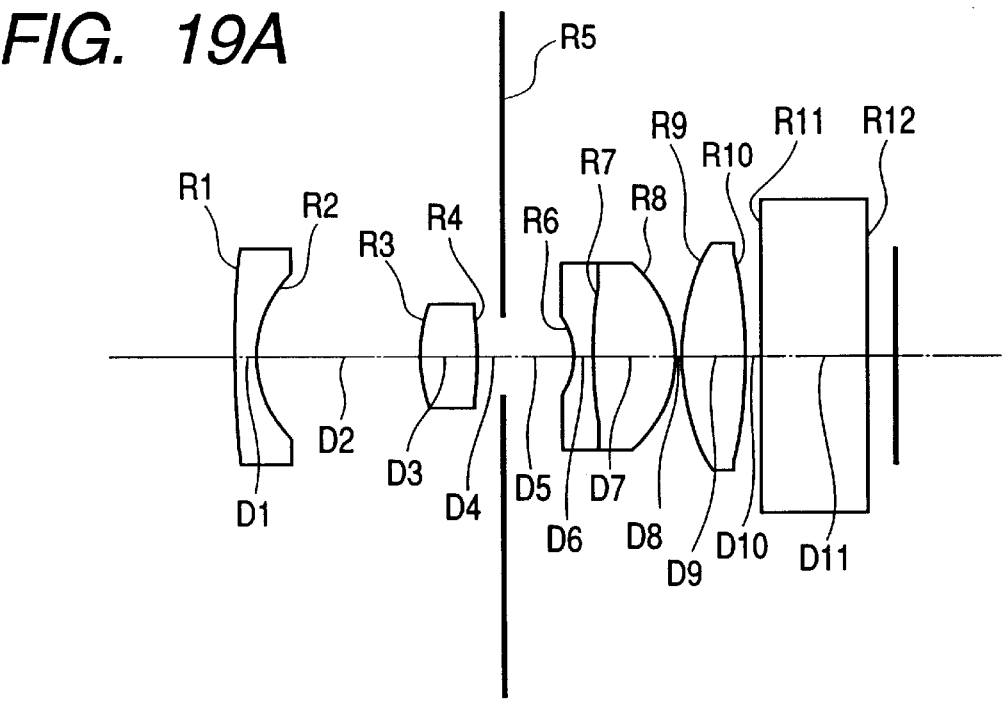
FIGS. 19A and 19B are sectional lens views of an objective lens according to Numerical Example 10.
Figure 19B:
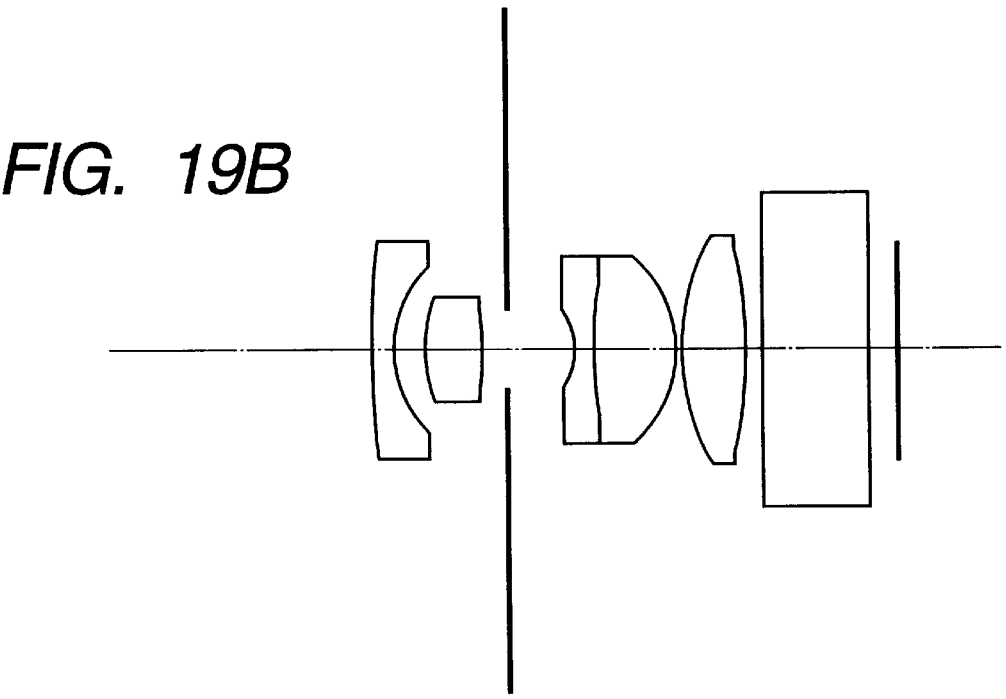
Figure 20A:
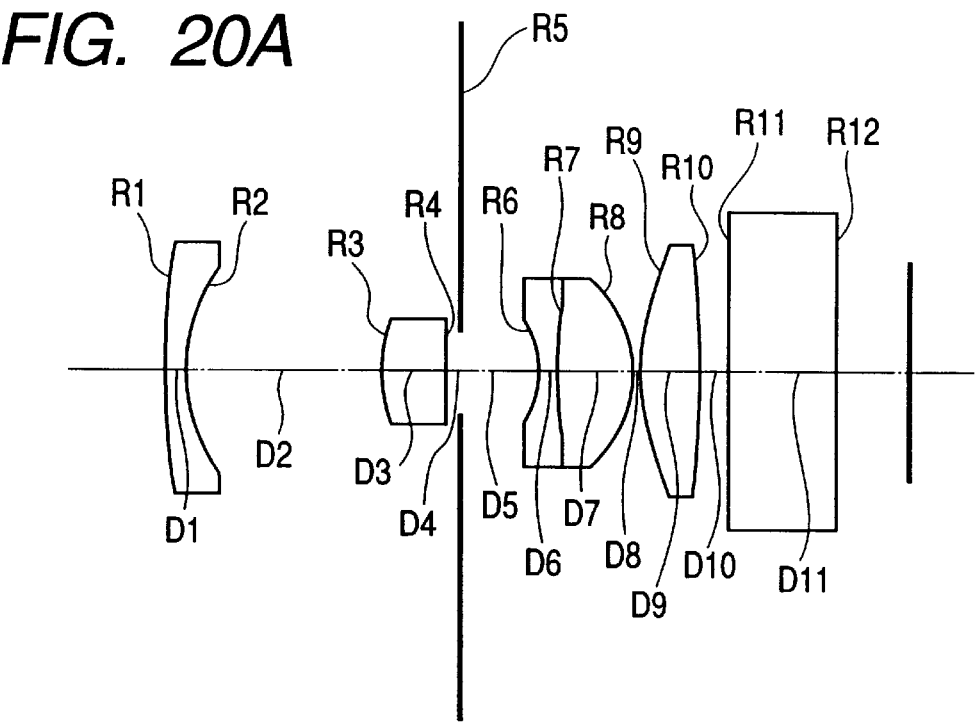
FIGS. 20A and 20B are sectional lens views of an objective lens according to Numerical Example 11.
Figure 20B:
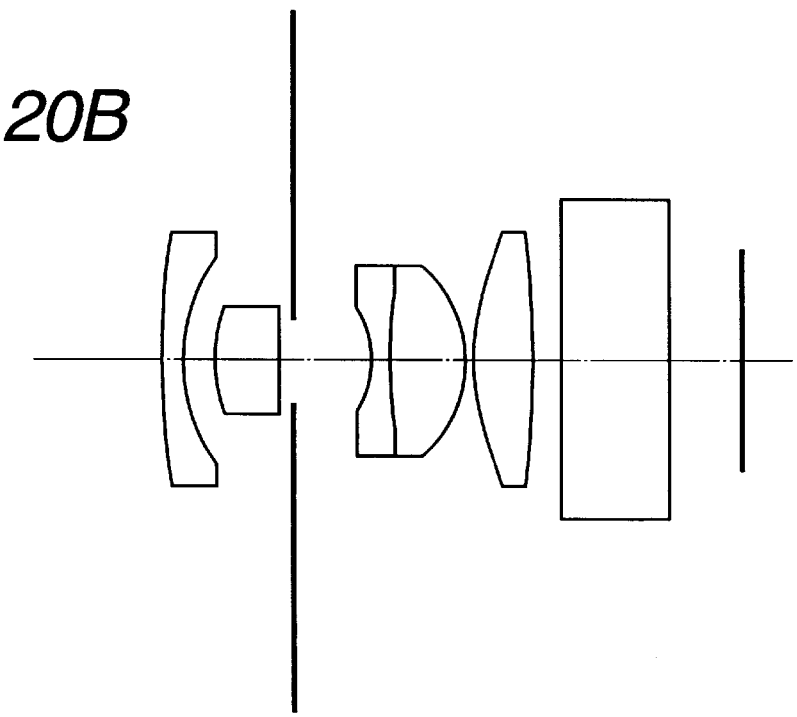

Besides, an image pickup device using an objective lens according to this embodiment enables the compaction in the direction of optical axis by collapsing a part of the above objective lens. In the above objective lens, though the total optical length is shortened to the utmost, further shortening the total optical length is implementable by moving the focusing lens toward the image field side as shown in FIG. 16B during not photographing operation in an image pickup device.

Figure 27:
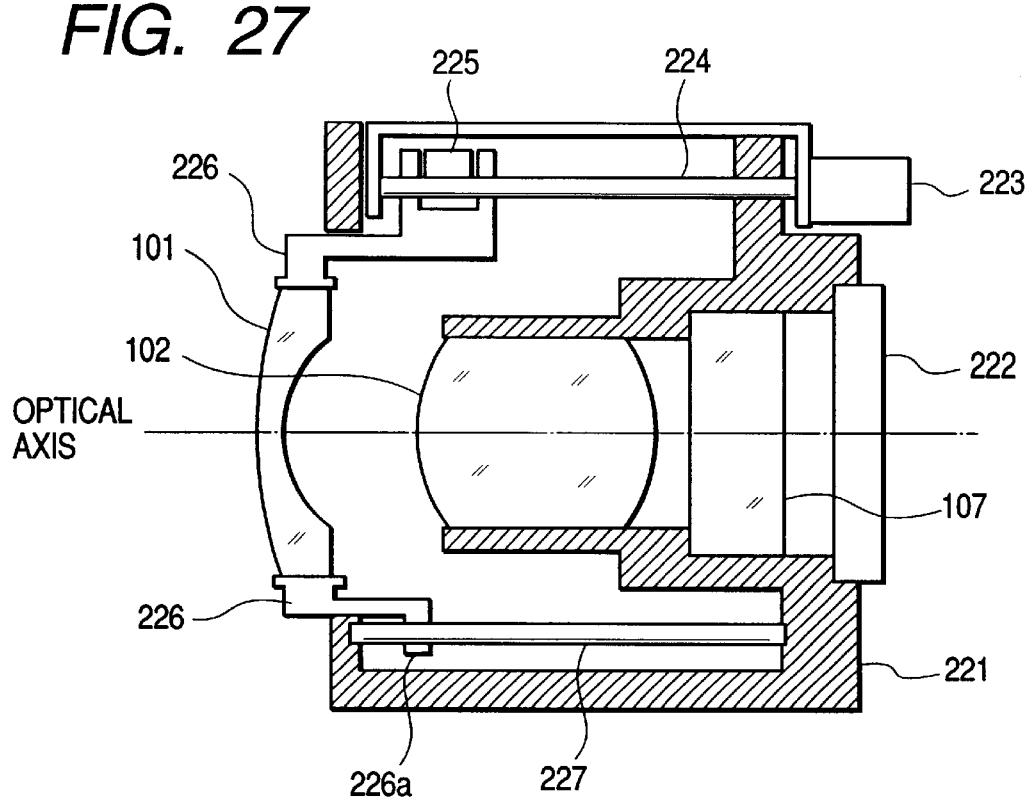
FIG. 27 is an illustration of the basic configuration of an image pickup device (during the photographing state)

FIG. 27 is a sectional view of the basic configuration of an image pickup device. In FIG. 27, the image pickup element comprises a lens barrel 221 designated with hatching for retaining the rear lens unit 102, the filter 107 and the like, a solid image pickup device 222 disposed on the imaging surface of the objective lens comprising the front lens unit 101, the rear lens unit 102 and the filter 107, a stepping motor (driving means) 223, an output axis 224 of the stepping motor 223, a rack member 225 engaged with the output axis 224, a moving ring 226 for retaining the front group 101 and a guide bar 227 positioned opposite the output axis 224 across the optical axis. Besides, the solid image pickup element also comprises an unshown guide bar on a section different from that of FIG. 27.

Figure 28:
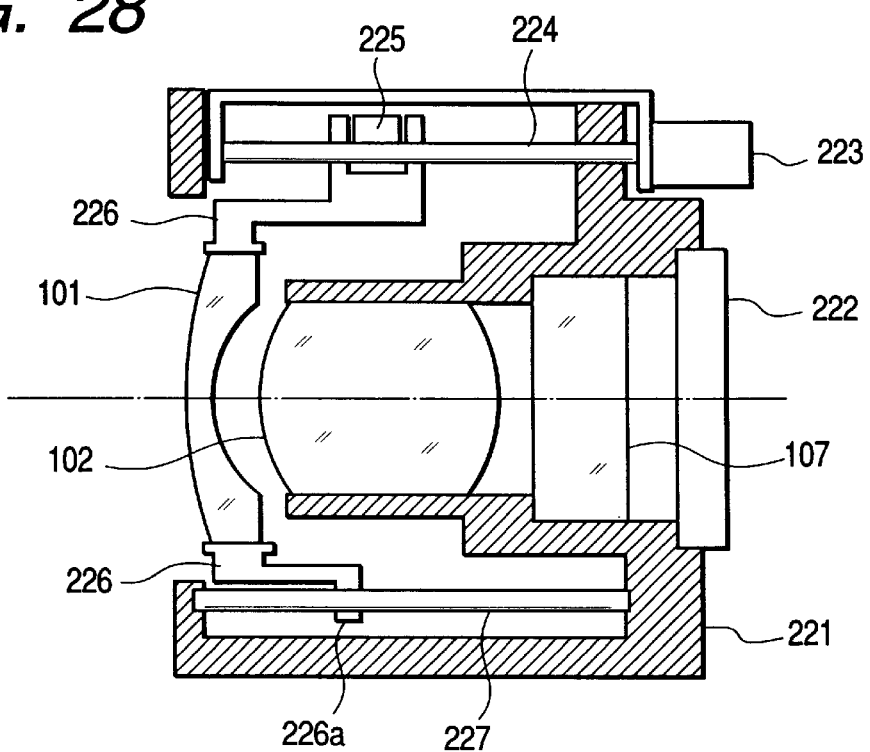
FIG. 28 is an illustration of the basic configuration of an image pickup device (during the collapse state).

The moving ring 226, retained by the guide bar 227 and the unshown guide bar, is so arranged as movable in the direction of optical axis. At this time, the moving ring 226 has an unshown sleeve part for mating with the unshown guide bar and a U-shaped groove (U-shaped, viewed in the direction of optical axis) 226a for suppressing the rotation around the optical axis to the guide bar 227. Besides, by converting the rotation of the output axis 224 into the torque toward the optical axis via the rack member 225, the moving ring 226 is driven along the optical axis. At this time, the moving ring 226 is driven by the distance corresponding to the number of input steps of the stepping motor 223. FIG. 27 shows the thrust state of the focusing lens for photographing, whereas FIG. 28 shows the collapse state of the focusing lens 101 by moving the moving ring 226 to the image field side at the not photographing time. Focusing is carried out by moving the focusing lens 101 in the direction of optical axis through the drive of the stepping motor 223 in FIG. 27. On the other hand, at the not photographing time, the focusing lens 101 is driven toward the image field side from the infinite focus position to reach the collapse state by using the same mechanism. Like this, an image pickup device according to the present invention jointly employs the focusing mechanism for the collapse mechanism and accordingly has no special mechanism for the collapse, the compaction in the direction of optical axis is implemented without making the apparatus greater in size.

Meanwhile, the focusing lens in an image pickup device according to this embodiment is driven to the photographing position shown in FIG. 27 and to the collapse position shown in FIG. 28 corresponding to the mode of a camera. In a digital still camera having display means such as liquid crystal device, for example, the following modes are considered.

<1> Autophotographing mode;
<2> Manual photographing mode;
<3> Power source off;
<4> Playback mode;
<5> Setting mode;
<6> Communicating mode.

MODE <1> is a photographing mode of automatically setting the ON/OFF of focus, exposure or stroboscope for a camera. MODE <2> is a photographing mode of setting the ON/OFF of focus, exposure or stroboscope for a photographer. MODE <3> is a mode of turning OFF the power supply of the total camera. MODE <4> is a mode of playbacking the photographed image by display means. MODE <5> is a mode of setting the level, date or the like of a file compression. MODE <6> is a mode of performing a data communication with a computer. Among these, Modes <1> and <2> are photographing modes and MODES <3> to <6> are not-photographing modes. With Power Supply OFF MODE <3> among MODES <3> to <6>, the focusing lens never fails to become the collapse state. Besides, also when other modes of MODES <3> to <6> are selected, the focusing lens may be collapsed. Especially, from the viewpoint of protecting the focusing lens, it is preferable to keep the collapse state as far as possible at the time of not photographing. Any of these modes can be selected optionally for a photographer by selecting means such as dial provided in the main camera body.

Besides, an objective lens according to the present invention is so arranged as to satisfy the following conditional expressions (1) to (3):

$$0.7 < |f1|/f < 3.0 \quad (1)$$
$$0.7 < f4/f < 3.0 \quad (2)$$
$$0.8 < f12/f < 2.5 \quad (3)$$

Here, fi: focal length of the i-th lens unit,
f12: composite focal length of the first and second lens units
f: focal length of the total objective lens system.

The technical meaning of conditional expressions (1) to (3) will be described.

The conditional expression (1) is an expression for defining the focal length or refractive power of the first lens unit 103.

When the refractive power weakens beyond the upper limit of the conditional expression (1), the action of holding the exit pupil far off from the image field in the first lens unit 103 weakens. If an attempt is made to hold the exit pupil far off from the image field in such a manner as to compensate this by means of the refractive power in the rear lens unit, the refractive power of a convex surface in the rear lens unit must be intensified, thereby disabling the Petzval sum to be reduced and leading to a frequent occurrence of curvature of field, so that this attempt is not advisable. Besides, if an attempt is made to hold the exit pupil far off from the image field without intensifying the refractive power of the rear lens unit, the total lens length becomes longer, thereby disabling a compact objective lens to be constructed. On the other hand, when the refractive power is intensified beyond the lower limit, an excess of aberration and astigmatism occurs in the first lens unit 103 and the correction becomes impossible even by using an aspherical surface, so that this case is not advisable. Besides, the back focus lengthens and shortening the total optical length becomes difficult.

The conditional expression (2) is an expression for defining the focal length or refractive power of the fourth lens unit 106.

When the refractive power weakens beyond the upper limit of the conditional expression (2), it becomes impossible to hold the exit pupil sufficiently apart from the image field and accordingly this case is not advisable. On the other hand, when the refractive power is intensified beyond the lower limit, an excess of aberration, curvature of field and astigmatism occur in the fourth lens unit 106 and the correction becomes impossible even by using an aspherical surface.

The conditional expression (3) is an expression for defining the focal length or refractive power of the composite system composed of the first lens unit 103 and the second lens unit 104.

When the refractive power weakens beyond the upper limit of the conditional expression (3), the back focus lengthens and it becomes difficult to shorten the total optical length. On the other hand, when the refractive power is intensified beyond the lower limit, it becomes difficult to obtain a good optical performance by suppressing the occurrence of various aberrations. Especially an excess of spherical aberration occurs and consequently the correction becomes difficult even by applying an aspherical surface.

Furthermore, in the correction of aberrations, those of satisfying the following conditions is preferable.

Letting r1, r2 and r3 be curvatures of radius in lens surfaces of the first lens of the first lens unit 103 on the object side and on the image field side and that of the second lens of the second lens unit 104 on the object side, it is preferable to satisfy the following relations:

$$0.7 < r3/r2 < 1.5 \qquad (4)$$

$$-2.3 < (r2+r1)/(r2-r1) < -1.0 \qquad (5)$$

The conditional expression (4) is an expression for defining the ratio of curvature radius between the lens surface on the image side of the first lens of the first lens unit and the lens surface on the object side of the second lens of the second lens unit.

When this ratio exceeds the upper limit of the conditional expression (4), the curvature radius in the lens surface on the object side of the second lens unit 104 goes apart from the concentric curvature radius for an off-axis ray and consequently the occurrence of comatic aberration becomes especially excessive often, thus leading to difficulty in the correction even by using an aspherical surface. When this ratio exceeds the lower limit of the conditional expression (4), the correction to the lens surface on the image side of the second lens unit 104 becomes excessive for a spherical over aberration occurring in the lens surface on the image side of the first lens unit 103, thus leading to difficulty in the correction even by using an aspherical surface.

The conditional expression (5) is an expression for defining the lens shape of the first lens of the first lens unit 103.

When the relevant ratio exceeds the upper limit of the conditional expression (5), the incident angle of an off-axis light flux on the lens surface on the object side in the first lens unit 103 increase, thus leading to difficulty in a good correction of curvature of field and astigmatism even by using an aspherical surface. When the ratio exceeds the lower limit of the expression (5), the curvature of the lens surface on the image side of the first lens unit 103 is excessively sharpened, thus leading to occurrence of spherical excessively over aberration.

Next, Numerical Examples 1 to 12 of numerical data according to the present invention will be shown. In individual numerical examples, Numerals Ri, Di and Ni and vi denote the curvature radius of the i-th optical part from the object side, the size or air clearance of the i-th optical part from the object side, and the refractive index and Abbe's number of the i-th optical part.

Numerical Expression 1

$$X = \frac{h^2/R}{1 + \{1-(h/R)^2\}^{1/2}} + Bh^4 + Ch^6 + Dh^8 + Eh^{10}$$

wherein

X: Coordinate determined from the object toward the image side along the optical axis by setting the vertex of an aspherical surface to the origin;

h: Coordinate vertical to the optical axis by setting the vertex of an aspherical surface to the origin;

R: Paraxial radius of curvature of an aspherical surface; and

B, C, D and E: Aspherical coefficients.

Besides, Table 1 shows the values of individual conditional expressions in individual numerical embodiments.

NUMERICAL EXAMPLE 1

| f = 1.00 | Fno = 2.50 | $2\omega = 65.2°$ | |
|---|---|---|---|
| R1 = 6.561 | D1 = 0.14 | N1 = 1.772499 | v1 = 49.6 |
| R2 = 1.100 | D2 = 1.00 | | |
| R3 = 1.186 | D3 = 0.40 | N2 = 1.772499 | v2 = 49.6 |
| R4 = −3.441 | D4 = 0.10 | | |
| R5 = Stop | D5 = 0.51 | | |
| R6 = −0.539 | D6 = 0.10 | N3 = 1.846660 | v3 = 23.8 |
| R7 = 4.804 | D7 = 0.50 | N4 = 1.677900 | v4 = 55.3 |
| R8 = −0.763 | D8 = 0.04 | | |
| R9 = 2.452 | D9 = 0.36 | N5 = 1.772499 | v5 = 49.6 |
| R10 = −3.035 | D10 = 0.40 | | |
| R11 = ∞ | D11 = 0.68 | N6 = 1.516330 | v6 = 64.2 |
| R12 = ∞ | | | |

Aspherical coefficients:

R9 B=−1.07887e−01; C=3.37571e−02;

D=−8.37316e−02; and E=0.00000e+00

Position of the exit pupil from the paraxial image field: −13.609

Total optical length: 4.511

NUMERICAL EXAMPLE 2

| f = 1.00 | Fno = 2.50 | $2\omega = 65.2°$ | |
|---|---|---|---|
| R1 = 4.006 | D1 = 0.14 | N1 = 1.772499 | v1 = 49.6 |
| R2 = 1.018 | D2 = 1.08 | | |
| R3 = Stop | D3 = 0.10 | | |
| R4 = 1.027 | D4 = 0.40 | N2 = 1.743997 | v2 = 44.8 |
| R5 = −4.383 | D5 = 0.62 | | |
| R6 = −0.499 | D6 = 0.10 | N3 = 1.846660 | v3 = 23.8 |
| R7 = 8.829 | D7 = 0.50 | N4 = 1.677900 | v4 = 55.3 |
| R8 = −0.799 | D8 = 0.04 | | |
| R9 = 2.287 | D9 = 0.36 | N5 = 1.772499 | v5 = 49.6 |
| R10 = −2.601 | D10 = 0.20 | | |
| R11 = ∞ | D11 = 0.68 | N6 = 1.516330 | v6 = 64.2 |
| R12 = ∞ | | | |

Aspherical coefficients:

R9 B=−1.05540e−01; C=1.62936e−02;

D=−2.41597e−02; and E=−1.56026e−02

Position of the exit pupil from the paraxial image field: −9.081

Total optical length: 4.622

NUMERICAL EXAMPLE 3

| f = 1.00 | Fno = 2.50 | 2ω = 49.1° | |
|---|---|---|---|
| R1 = 7.143 | D1 = 0.10 | N1 = 1.772499 | ν1 = 49.6 |
| R2 = 0.686 | D2 = 0.43 | | |
| R3 = 0.862 | D3 = 0.29 | N2 = 1.743997 | ν2 = 44.8 |
| R4 = −2.521 | D4 = 0.07 | | |
| R5 = Stop | D5 = 0.54 | | |
| R6 = −0.436 | D6 = 0.07 | N3 = 1.846660 | ν3 = 23.8 |
| R7 = 9.048 | D7 = 0.31 | N4 = 1.696797 | ν4 = 55.5 |
| R8 = −0.949 | D8 = 0.03 | | |
| R9 = 3.504 | D9 = 0.37 | N5 = 1.772499 | ν5 = 49.6 |
| R10 = −0.944 | D10 = 0.29 | | |
| R11 = ω | D11 = 0.49 | N6 = 1.516330 | ν6 = 64.2 |
| R12 = ω | | | |

Aspherical coefficients:

R10 B=2.54127e−01; C=4.98937e−02;

D=3.61130e−01; and E=−4.06567e−01

Position of the exit pupil from the paraxial image field: −24.255

Total optical length: 3.711

NUMERICAL EXAMPLE 4

| f = 1.00 | Fno = 2.50 | 2ω = 77.3° | |
|---|---|---|---|
| R1 = 5.506 | D1 = 0.18 | N1 = 1.772499 | ν1 = 49.6 |
| R2 = 0.975 | D2 = 1.30 | | |
| R3 = 1.059 | D3 = 0.45 | N2 = 1.677900 | ν2 = 54.9 |
| R4 = −2.511 | D4 = 0.20 | | |
| R5 = Stop | D5 = 0.55 | | |
| R6 = −0.574 | D6 = 0.18 | N3 = 1.846660 | ν3 = 23.8 |
| R7 = 6.627 | D7 = 0.65 | N4 = 1.696797 | ν4 = 55.5 |
| R8 = −1.025 | D8 = 0.05 | | |
| R9 = 1.928 | D9 = 0.50 | N5 = 1.677900 | ν5 = 54.9 |
| R10 = −2.424 | D10 = 0.13 | | |
| R11 = ω | D11 = 0.85 | N6 = 1.516330 | ν6 = 64.2 |
| R12 = ω | | | |

Aspherical coefficients:

R3 B=−3.74809e−02; C=−2.99963e−01;

D=0.00000e+00; and E=0.00000e+00

R10 B=1.40788e−01; C=−3.66529e−02;

D=1.89036e−02; and E=0.00000e+00

Position of the exit pupil from the paraxial image field: −16.540

Total optical length: 5.257

NUMERICAL EXAMPLE 5

| f = 1.00 | Fno = 2.50 | 2ω = 93.7° | |
|---|---|---|---|
| R1 = 6.740 | D1 = 0.33 | N1 = 1.772499 | ν1 = 49.6 |
| R2 = 1.338 | D2 = 2.33 | | |
| R3 = 1.161 | D3 = 0.60 | N2 = 1.567322 | ν2 = 42.8 |
| R4 = −4.006 | D4 = 0.33 | | |
| R5 = Stop | D5 = 0.33 | | |
| R6 = −0.747 | D6 = 0.23 | N3 = 1.846660 | ν3 = 23.8 |
| R7 = 2.537 | D7 = 0.83 | N4 = 1.696797 | ν4 = 55.5 |
| R8 = −1.207 | D8 = 0.07 | | |
| R9 = 1.832 | D9 = 0.80 | N5 = 1.563839 | ν5 = 60.7 |
| R10 = −3.531 | D10 = 0.17 | | |
| R11 = ω | D11 = 1.13 | N6 = 1.516330 | ν6 = 64.2 |
| R12 = ω | | | |

Aspherical coefficients:

R1 B=1.89860e−02; C=−2.97310e−03;

D=2.60021e−04; and E=0.00000e+00

R3 B=5.12444e−03; C=−1.59078e−02;

D=−9.71925e−02; and E=0.00000e+00

R9 B=−7.18366e−02; C=1.84468e−02;

D=−5.98903e−03; and E=0.00000e+00

Position of the exit pupil from the paraxial image field: −14.695

Total optical length: 7.570

NUMERICAL EXAMPLE 6

| f = 1.00 | Fno = 2.50 | 2ω = 69.7° | |
|---|---|---|---|
| R1 = 3.492 | D1 = 0.15 | N1 = 1.772499 | ν1 = 49.6 |
| R2 = 1.069 | D2 = 1.30 | | |
| R3 = 1.027 | D3 = 0.43 | N2 = 1.743997 | ν2 = 44.8 |
| R4 = 24.503 | D4 = 0.09 | | |
| R5 = Stop | D5 = 0.54 | | |
| R6 = −0.582 | D6 = 0.11 | N3 = 1.846660 | ν3 = 23.8 |
| R7 = 2.694 | D7 = 0.54 | N4 = 1.677900 | ν4 = 55.3 |
| R8 = −0.850 | D8 = 0.04 | | |
| R9 = 1.494 | D9 = 0.39 | N5 = 1.772499 | ν5 = 49.6 |
| R10 = −8.547 | D10 = 0.22 | | |
| R11 = ω | D11 = 0.74 | N6 = 1.516330 | ν6 = 64.2 |
| R12 = ω | | | |

Aspherical coefficients:

R2 B=−3.29786e−02; C=−9.81517e−02;

D=4.58637e−02; and E=0.00000e+00

R9 B=−7.58203e−02; C=−1.94961e−02;

D=3.80518e−02; and E=−2.74684e−02

Position of the exit pupil from the paraxial image field: −22.865

Total optical length: 5.059

NUMERICAL EXAMPLE 7

| f = 1.00 | Fno = 2.50 | 2ω = 69.7° | |
|---|---|---|---|
| R1 = 2.174 | D1 = 0.15 | N1 = 1.772499 | ν1 = 49.6 |
| R2 = 0.870 | D2 = 1.30 | | |
| R3 = 0.932 | D3 = 0.43 | N2 = 1.743997 | ν2 = 44.8 |
| R4 = −19.264 | D4 = 0.09 | | |
| R5 = Stop | D5 = 0.43 | | |
| R6 = −0.576 | D6 = 0.11 | N3 = 1.846660 | ν3 = 23.8 |
| R7 = 1.679 | D7 = 0.54 | N4 = 1.677900 | ν4 = 55.3 |
| R8 = 31 0.870 | D8 = 0.04 | | |
| R9 = 1.551 | D9 = 0.39 | N5 = 1.772499 | ν5 = 49.6 |
| R10 = −7.189 | D10 = 0.22 | | |
| R11 = ω | D11 = 0.74 | N6 = 1.516330 | ν6 = 64.2 |
| R12 = ω | | | |

Aspherical coefficients:

R2 B=−1.46698e−02; C=−1.58150e−01;

D=−5.05301e02; and E=0.00000e+00

R9 B=−6.95675e−02; C=−3.59198e−02;

D=3.48474e−02; and E=−1.07646e−02

Position of the exit pupil from the paraxial image field: −8.071

Total optical length: 4.796

NUMERICAL EXAMPLE 8

| f = 1.00 | Fno = 2.50 | 2ω = 65.2° | |
|---|---|---|---|
| R1 = 6.561 | D1 = 0.14 | N1 = 1.772499 | ν1 = 49.6 |
| R2 = 1.100 | D2 = 1.00 | | |
| R3 = 1.186 | D3 = 0.40 | N2 = 1.772499 | ν2 = 49.6 |
| R4 = −3.441 | D4 = 0.10 | | |
| R5 = Stop | DS = 0.51 | | |
| R6 = −0.539 | D6 = 0.10 | N3 = 1.846660 | ν3 = 23.8 |
| R7 = 4.804 | D7 = 0.50 | N4 = 1.677900 | ν4 = 55.3 |
| R8 = −0.763 | D8 = 0.04 | | |
| R9 = 2.452 | D9 = 0.36 | N5 = 1.772499 | ν5 = 49.6 |
| R10 = −3.035 | D10 = 0.40 | | |
| R11 = ∞ | D11 = 0.68 | N6 = 1.516330 | ν6 = 64.2 |
| R12 = ∞ | | | |
| Infinite focus | Short distance (β = −0.058) | Collapse state | |
| D2   1.00 | 1.17 | 0.20 | |

Aspherical coefficients:

R9 B=−1.07887e−01; C=3.37571e−02;

D=−8.37316e−02; and E=0.00000e+00

Position of the exit pupil from the paraxial image field: −13.609

Total optical length (infinite object state): 4.511

Total optical length (collapse state): 3.711

NUMERICAL EXAMPLE 9

| f = 1.00 | Fno = 2.50 | 2ω 32 65.2° | |
|---|---|---|---|
| R1 = 4.006 | D1 = 0.14 | N1 = 1.772499 | ν1 = 49.6 |
| R2 = 1.018 | D2 = 1.08 | | |
| R3 = Stop | D3 = 0.10 | | |
| R4 = 1.027 | D4 = 0.40 | N2 = 1.743997 | ν2 = 44.8 |
| R5 = −4.383 | D5 = 0.62 | | |
| R6 = −0.499 | D6 = 0.10 | N3 = 1.846660 | ν3 = 23.8 |
| R7 = 8.829 | D7 = 0.50 | N4 = 1.677900 | ν4 = 55.3 |
| R8 = −0.799 | D8 = 0.04 | | |
| R9 = 2.287 | D9 = 0.36 | N5 = 1.772499 | ν5 = 49.6 |
| R10 = −2.601 | D10 = 0.20 | | |
| R11 = ∞ | D11 = 0.68 | N6 = 1.516330 | ν6 = 64.2 |
| R12 = ∞ | | | |
| Infinite focus | Short distance (β = −0.058) | Collapse state | |
| D2   1.08 | 1.27 | 0.28 | |

Aspherical coefficients:

R9 B=−1.05540e−01; C=1.62936e−02;

D=−2.41597e−02; and E=−1.56026e−02

Position of the exit pupil from the paraxial image field: −9.081

Total optical length (infinite object state): 4.622

Total optical length (collapse state): 3.822

NUMERICAL EXAMPLE 10

| f = 1.00 | Fno = 2.50 | 2ω = 77.3° | |
|---|---|---|---|
| R1 = 5.506 | D1 = 0.18 | N1 = 1.772499 | ν1 = 49.6 |
| R2 = 0.975 | D2 = 1.30 | | |
| R3 = 1.059 | D3 = 0.45 | N2 = 1.677900 | ν2 = 54.9 |
| R4 = −2.511 | D4 = 0.20 | | |
| R5 = Stop | D5 = 0.55 | | |
| R6 = −0.574 | D6 = 0.18 | N3 = 1.846660 | ν3 = 23.8 |
| R7 = 6.627 | D7 = 0.65 | N4 = 1.696797 | ν4 = 55.5 |
| R8 = −1.025 | D8 = 0.05 | | |
| R9 = 1.928 | D9 = 0.50 | N5 = 1.677900 | ν5 = 54.9 |
| R10 = −2.424 | D10 = 0.13 | | |
| R11 = ∞ | D11 = 0.85 | N6 = 1.516330 | ν6 = 64.2 |
| R12 = ∞ | | | |
| Infinite focus | Short distance (β = −0.047) | Collapse state | |
| D2   1.30 | 1.41 | 0.25 | |

Aspherical coefficients:

R3 B=−3.74809e−02; C=−2.99963e−01;

D=0.00000e;00; and E=0.00000e+00

R10 B=1.40788e−01; C=−3.66529e−02;

D=1.89036e−02; and E=0.00000e+00

Position of the exit pupil from the paraxial image field: −16.540

Total optical length (infinite object state): 5.257

Total optical length (collapse state): 4.207

NUMERICAL EXAMPLE 11

| f = 1.00 | Fno = 2.50 | 2ω = 69.7° | |
|---|---|---|---|
| R1 = 3.492 | D1 = 0.15 | N1 = 1.772499 | ν1 = 49.6 |
| R2 = 1.069 | D2 = 1.30 | | |
| R3 = 1.027 | D3 = 0.43 | N2 = 1.743997 | ν2 = 44.8 |
| R4 = 24.503 | D4 = 0.09 | | |
| R5 = Stop | D5 = 0.54 | | |
| R6 = −0.582 | D6 = 0.11 | N3 = 1.846660 | ν3 = 23.8 |
| R7 = 2.694 | D7 = 0.54 | N4 = 1.677900 | ν4 = 55.3 |
| R8 = −0.850 | D8 = 0.04 | | |
| R9 = 1.494 | D9 = 0.39 | N5 = 1.772499 | ν5 =49.6 |
| R10 = −8.547 | D10 = 0.22 | | |
| R11 = ∞ | D11 = 0.74 | N6 = 1.516330 | ν6 = 64.2 |
| R12 = ∞ | | | |
| Infinite focus | Short distance (β = −0.054) | Collapse state | |
| D2   1.30 | 1.53 | 0.22 | |

Aspherical coefficients:

R2 B=−3.29786e−02; C=−9.81517e−02;

D=4.58637e−02; and E=0.00000e+00

R9 B=−7.58203e−02; C=−1.94961e−02;

D=3.80518e−02; and E=−2.74684e−02

Position of the exit pupil from the paraxial image field: −22.865

Total optical length (infinite object state): 5.059

Total optical length (collapse state): 3.979

NUMERICAL EXAMPLE 12

| f = 1.00 | Fno = 2.50 | 2ω = 65.2° | |
|---|---|---|---|
| R1 = 6.750 | D1 = 0.14 | N1 = 1.696797 | ν1 = 55.5 |
| R2 = 1.003 | D2 = 1.10 | | |
| R3 = 1.197 | D3 = 0.40 | N2 = 1.772499 | ν2 = 49.6 |
| R4 = −3.396 | D4 = 0.20 | | |
| R5 = Stop | D5 = 0.46 | | |
| R6 = −0.539 | D6 = 0.10 | N3 = 1.846660 | ν3 = 23.8 |
| R7 = −30.127 | D7 = 0.06 | | |
| R8 = 65.281 | D8 = 0.50 | N4 = 1.696797 | ν4 = 55.5 |
| R9 = −0.834 | D9 = 0.04 | | |
| R10 = 1.723 | D10 = 0.36 | N5 = 1.583126 | ν5 = 59.4 |
| R11 = −3.113 | D11 = 0.20 | | |
| R12 = ∞ | D12 = 0.68 | N6 = 1.516330 | ν6 = 64.2 |
| R13 = ∞ | | | |

-continued

| | Infinite focus | Short distance ($\beta = -0.059$) | Collapse state |
|---|---|---|---|
| D2 | 1.10 | 1.27 | 0.20 |

Aspherical coefficients:
R10 B=−1.57488e−01; C=4.03051e−02;
D=−1.37226e−01; and E=0.00000e+00
Position of the exit pupil from the paraxial image field: −14.174
Total optical length (infinite object state): 4.672
Total optical length (collapse state): 3.772

TABLE 1

| Example | 1, 8 | 2, 9 | 3 | 4, 10 | 5 | 6, 11 | 7 | 12 |
|---|---|---|---|---|---|---|---|---|
| (1) | 1.73 | 1.80 | 0.99 | 1.56 | 2.22 | 2.05 | 1.97 | 1.71 |
| (2) | 1.81 | 1.63 | 1.00 | 1.66 | 2.26 | 1.68 | 1.68 | 1.96 |
| (3) | 1.29 | 1.13 | 1.58 | 1.02 | 1.25 | 1.56 | 1.18 | 1.22 |
| (4) | 1.08 | 1.03 | 1.26 | 1.09 | 0.87 | 0.96 | 1.07 | 1.19 |
| (5) | −1.40 | −1.68 | −1.21 | −1.43 | −1.50 | −1.88 | −2.33 | −1.35 |

By appropriately setting the lens configuration like this, according to this embodiment, telecentric objective lenses can be attained which has a good optical performance over all the object distance from an infinite object to a near object with the exit pupil kept apart from the image field while widening the photographing field angle and shortening the total lens length is intended and moreover a high optical performance of well corrected various aberrations on the whole image at a photographing field angle of about 65–77 and an F number of about 2.5.

Besides, it is possible to provide an image pickup device excellent in focusing response and small in power consumption.

Besides, it is possible to provide an image pickup device still more compact in the direction of optical axis at the time of not photographing.

What is claimed is:

1. An objective lens consisting of the following four lens units in sequence from the object side:
   a first lens unit consisting of a first lens of negative refractive power in the shape of a meniscus with a concave surface toward the image field side;
   a second lens unit consisting of a second lens of positive refractive power;
   a third lens unit consisting of a composite lens having joined together a third lens of negative refractive power with a concave surface toward the object side and a fourth lens of positive refractive power with a convex surface toward the image field side, said third lens unit having, as a whole, negative refractive power; and
   a fourth lens unit consisting of a fifth lens of positive refractive power,
   wherein on letting fi, f12, and f be the focal length of an i-th lens unit, the composite focal length of the first lens unit and a second lens unit, and the focal length of the whole objective lens system, respectively, the conditions of $0.7 < |f1|/f < 3.0$, $0.7 < f4/f < 3.0$, and $0.8 < f12/f < 2.5$ are satisfied.

2. An objective lens according to claim 1, wherein said fourth lens unit has at least one aspherical surface.

3. An objective lens according to claim 2, wherein the aspherical surface of said fourth lens unit is so shaped that the convergent action weakens gradually in a direction from the optical axis to the marginal portion.

4. An objective lens according to claim 2, wherein said first lens unit has at least one aspherical surface.

5. An objective lens according to claim 4, wherein the aspherical surface of said first lens unit is so shaped that the divergent action weakens gradually in a direction from the optical axis to the marginal portion.

6. An objective lens comprising the following lens units in sequence from the object side:
   a first lens unit consisting of a first lens of negative refractive power in the shape of a meniscus with a concave surface toward the image field side;
   a second lens unit consisting of a second lens of positive refractive power;
   a third lens unit consisting of a composite lens having joined together a third lens of negative refractive power with a concave surface toward the object side and a fourth lens of positive refractive power with a convex surface toward the image field side, said third lens unit having, as a whole, negative refractive power; and
   a fourth lens unit consisting of a fifth lens of positive refractive power,
   wherein on letting fi, f12, and f be the focal length of an i-th lens unit, the composite focal length of the first lens unit and a second lens unit, and the focal length of the whole objective lens system, respectively, the conditions of $0.7 < |f1|/f < 3.0$, $0.7 < f4/f < 3.0$, and $0.8 < f12/f < 2.5$ are satisfied, wherein said second lens unit has at least one aspherical surface.

7. An objective lens according to claim 6, wherein the aspherical surface of said second lens unit is so shaped that the convergent action weakens gradually in a direction from the optical axis to the marginal portion.

8. An objective lens according to claim 6, wherein said first lens unit has at least one aspherical surface.

9. An objective lens according to claim 8, wherein the aspherical surface of said first lens unit is so shaped that the divergent action weakens gradually in a direction from the optical axis to the marginal portion.

10. An objective lens according to claim 1, wherein said fifth lens is a biconvex lens.

11. An objective lens according to claim 1, further comprising a stop, wherein said stop is disposed either between said first lens unit and said second lens unit or between said second lens unit and said third lens unit.

12. An objective lens comprising the following lens units in sequence from the object side:
   a front lens unit of negative refractive power, said front lens unit consisting of a first lens of negative refractive power in the shape of a meniscus with a concave surface toward the image field side; and
   a rear lens unit of positive refractive power, said rear lens unit comprising a second lens of positive refractive power nearest to the object with a convex surface toward the object side, wherein, a lens free region is provided between said front lens unit and said rear lens unit, and focusing is carried out by moving only said front lens unit in the direction of the optical axis.

13. An objective lens comprising the following lens units in sequence from the object side:

a front lens unit of negative refractive power, said front lens unit consisting of a first lens of negative refractive power in the share of a meniscus with a concave surface toward the image field side; and a rear lens unit of positive refractive power, said rear lens unit comprising a second lens of positive refractive power nearest to the object with a convex surface toward the object side, wherein focusing is carried out by moving only said front lens unit in the direction of the optical axis, and wherein on letting r1 and r2 be radii of curvature of lens surfaces on the object side and the image field side of said first lens and r3 be a radius of lens surface on the object side of said second lens, the conditions of $0.7 < r3/r2 < 1.5$ and $-2.3 < (r2+r1)/(r2-r1) < -1.0$ are satisfied.

14. An objective lens comprising the following lens units in sequence from the object side:

a front lens unit of negative refractive power, said front lens unit consisting of a first lens of negative refractive power in the shape of a meniscus with a concave surface toward the image field side; and a rear lens unit of positive refractive power, said rear lens unit comprising a second lens of positive refractive power nearest to the object with a convex surface toward the object side, wherein focusing is carried out by moving only said front lens unit in the direction of the optical axis, and wherein said rear lens unit has at least one negative lens and consists of 4 lenses or less.

15. An objective lens comprising the following lens units in sequence from the object side:

a front lens unit of negative refractive power, said front lens unit consisting of a first lens of negative refractive power in the shape of a meniscus with a concave surface toward the image field side; and a rear lens unit of positive refractive power, said rear lens unit comprising a second lens of positive refractive power nearest to the object with a convex surface toward the object side, wherein focusing is carried out by moving said front lens unit in the direction of the optical axis, wherein said rear lens unit has at least one negative lens and consists of four lenses or less, and wherein said rear lens unit consists of the following lenses in order from the object side:

said second lens;

a composite lens of negative refractive power in the shape of a meniscus with a convex surface directed toward the image field side, said composite lens having joined together a negative lens with a concave surface directed toward the object side and a positive lens with a convex surface directed toward the image field side; and a biconvex positive lens.

16. An objective lens comprising the following lens units in sequence from the object side:

a front lens unit of negative refractive power, said front lens unit consisting of a first lens of negative refractive power in the shape of a meniscus with a concave surface toward the image field side; and a rear lens unit of positive refractive power, said rear lens unit comprising a second lens of positive refractive power nearest to the object with a convex surface toward the object side, wherein focusing is carried out by moving said front lens unit in the direction of the optical axis, wherein said rear lens unit has at least one negative lens and consists of four lenses or less, wherein said rear lens unit consists of the following lenses in order from the object side:

said second lens;

a negative lens with a concave surface directed toward the object side;

a positive lens with a convex surface directed toward the image field side; and a biconvex positive lens.

17. An objective lens according to claim 12, wherein said objective lens has at least one aspherical surface.

18. An image pickup device comprising:

an objective lens as set forth in any of claims 1 to 17 and an image pickup element for receiving an image formed by said objective lens.

19. An image pickup device comprising: an objective lens which comprises the following lens units in sequence from the object side, (a) a front lens of negative refractive power, said front lens unit consisting of a first lens of negative refractive power in the shape of a meniscus with a concave surface toward the image field side, and (b) a rear lens unit of positive refractive power, said rear lens unit comprising a second lens of positive refractive power nearest to the object with a convex surface directed toward the object side, wherein, a lens free region is provided between said front lens unit and said rear lens unit, and focusing is carried out by moving only said front lens unit in the direction of the optical axis;

driving means for moving said front lens unit in focusing; and selecting means for selecting a specific mode from a plurality of modes of said image pickup device, wherein when a predetermined mode is selected, said front lens unit is moved by said driving means to a still nearer position of the image side than the focused position for an infinite object.

20. An image pickup device according to claim 19, wherein said predetermined mode is a mode of not photographing for said image pickup device.

21. An objective lens according to claim 12, wherein light emerging from said front lens unit is directly incident on said rear lens unit.

22. An image pickup device according to claim 19, wherein light emerging from said front lens unit is directly incident on said rear lens unit.

* * * * *

UNITED STATES PATENT AND TRADEMARK OFFICE
CERTIFICATE OF CORRECTION

PATENT NO.   : 6,236,521 B1
DATED        : May 22, 2001
INVENTOR(S)  : Norihiro Nanba It is certified that error appears in the above-identified patent and that said Letters Patent is hereby corrected as shown below:

Column 3,
Line 39, "control" should read -- controlled --.

Column 6,
Line 31, "illustration" should read -- illustrations --.

Column 7,
Line 30, "a" should read -- an --.

Column 8,
Line 40, "of f" should read -- off --.

Column 9,
Line 28, "sufficient" should read -- sufficiently --.

Column 16,
Line 51, "R8=31 0.870" should read -- R8= -0.870 --.

Column 17,
Line 8, "DS" should read -- D5 --.
Line 12, "NS" should read -- N5 --.
Line 32, "32", should read -- = --.

Column 18,
Line 13, "e;00;" should read -- e+00 --.

UNITED STATES PATENT AND TRADEMARK OFFICE
CERTIFICATE OF CORRECTION

PATENT NO. : 6,236,521 B1
DATED : May 22, 2001
INVENTOR(S) : Norihiro Nanba

It is certified that error appears in the above-identified patent and that said Letters Patent is hereby corrected as shown below:

<u>Column 22,</u>
Line 29, "1 to 17" should read -- 1 to 17 and 21 --.

Signed and Sealed this

Fifteenth Day of October, 2002

Attest:

Attesting Officer

JAMES E. ROGAN
*Director of the United States Patent and Trademark Office*